United States Patent
Matsuda et al.

(10) Patent No.: US 12,196,605 B2
(45) Date of Patent: Jan. 14, 2025

(54) POSITION DETECTION DEVICE AND POSITION DETECTION METHOD

(71) Applicant: NEC Corporation, Tokyo (JP)

(72) Inventors: Yuma Matsuda, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 313 days.

(21) Appl. No.: 17/778,561

(22) PCT Filed: Nov. 25, 2019

(86) PCT No.: PCT/JP2019/045896
§ 371 (c)(1),
(2) Date: May 20, 2022

(87) PCT Pub. No.: WO2021/106025
PCT Pub. Date: Jun. 3, 2021

(65) Prior Publication Data
US 2023/0019450 A1 Jan. 19, 2023

(51) Int. Cl.
*G01H 9/00* (2006.01)
*G01D 5/353* (2006.01)

(52) U.S. Cl.
CPC ......... *G01H 9/006* (2013.01); *G01D 5/35361* (2013.01)

(58) Field of Classification Search
CPC .... G01H 9/006; G01H 9/004; G01D 5/35361; G01D 5/35358; G01B 11/00
See application file for complete search history.

(56) References Cited

U.S. PATENT DOCUMENTS

| 2017/0260839 A1 | 9/2017 | Beardmore et al. |
| 2018/0259385 A1* | 9/2018 | Cedilnik ............... G01H 9/004 |
| 2018/0342156 A1* | 11/2018 | Martin .................. G08G 1/052 |

FOREIGN PATENT DOCUMENTS

| JP | 2005-349892 A | 12/2005 |
| JP | 2007-506960 A | 3/2007 |

(Continued)

OTHER PUBLICATIONS

Peng, Zhaoqiang, et al. "Fiber-optical distributed acoustic sensing signal enhancements using ultrafast laser and artificial intelligence for human movement detection and pipeline monitoring." Optical Data Science II. vol. 10937. SPIE, 2019. (Year: 2019).*

(Continued)

*Primary Examiner* — Tarifur R Chowdhury
*Assistant Examiner* — Carlos Perez-Guzman
(74) *Attorney, Agent, or Firm* — Sughrue Mion, PLLC

(57) ABSTRACT

A position detection device includes a transmitter that transmits an optical pulse into an optical transmission line laid along the movement path of a moving body; a detector that detects back-scattered light in the optical transmission line; a data processor that calculates the intensity of the back-scattered light and the generation position of the back-scattered light; a storage in which the processing results of the data processor are saved; a search range derivation circuit that derives a search range for the position of the moving body; a maximum value extraction circuit that extracts the generation position at which the variation of intensity within the search range is at a maximum, and causes the extracted generation position to be saved in the storage; and an output circuit that outputs the extraction result.

20 Claims, 20 Drawing Sheets

(56) References Cited

FOREIGN PATENT DOCUMENTS

| | | | |
|---|---|---|---|
| JP | 2007-187578 | A | 7/2007 |
| JP | 2007-198756 | A | 8/2007 |
| JP | 2017-134681 | A | 8/2017 |
| JP | 2017-134746 | A | 8/2017 |
| JP | 2018-194372 | A | 12/2018 |

OTHER PUBLICATIONS

International Search Report for PCT Application No. PCT/JP2019/045896, mailed on Feb. 25. 2020.

English translation of Written opinion for PCT Application No. PCT/JP2019/045896, mailed on Feb. 25, 2020.

\* cited by examiner

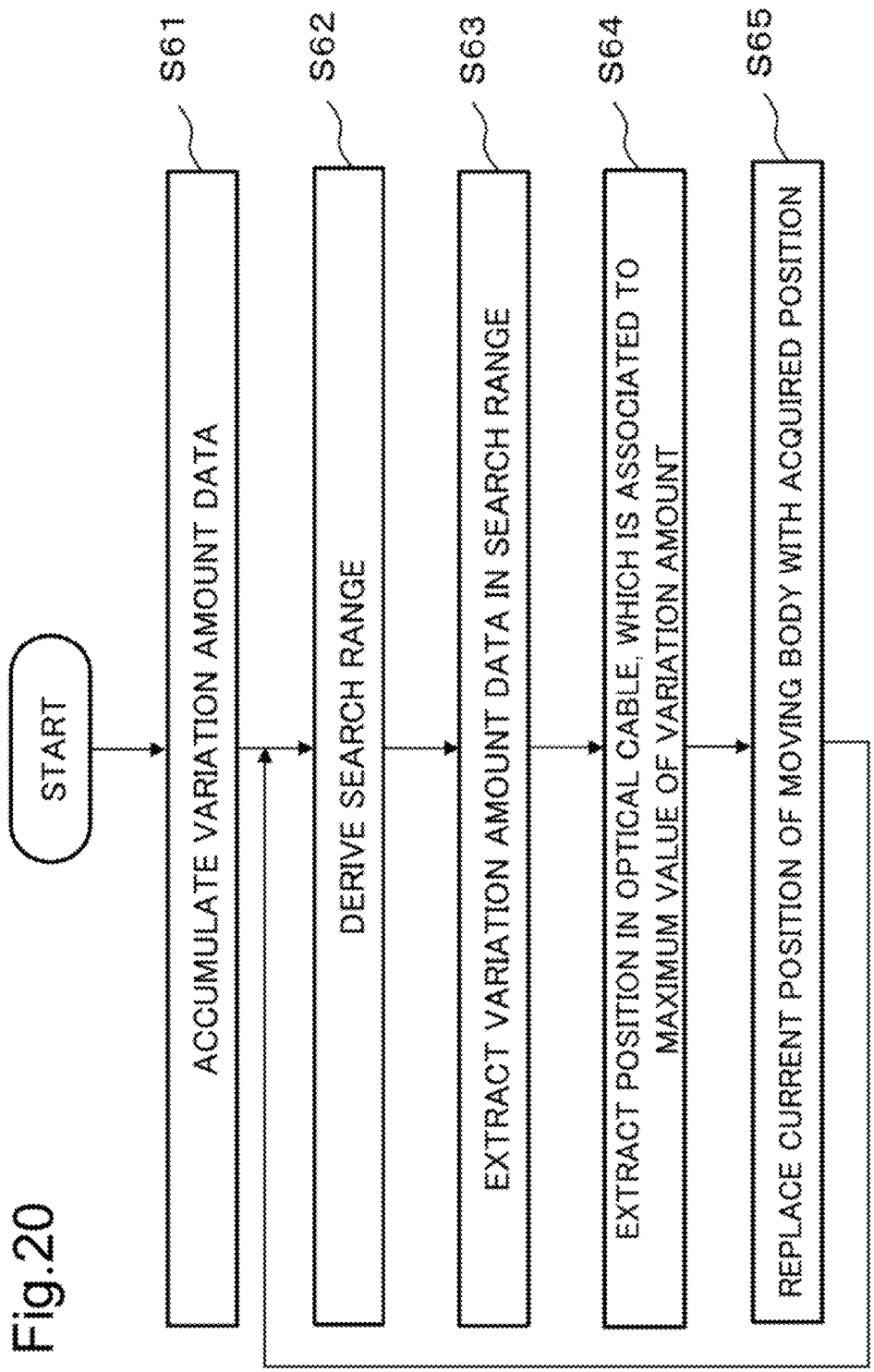

POSITION DETECTION DEVICE AND POSITION DETECTION METHOD

This application is a National Stage Entry of PCT/JP2019/045896 filed on Nov. 25, 2019, the contents of all of which are incorporated herein by reference, in their entirety.

TECHNICAL FIELD

The present invention relates to a position detection device and a position detection method, and particularly relates to a position detection device and a position detection method for a moving body that utilize optical fiber sensing.

BACKGROUND ART

Optical fiber sensing is a technique of using an optical fiber as a sensor for vibration, sound, deformation, or temperature. Optical fiber sensing is utilized in fields of detection of intrusion into main facilities, monitoring of a traffic flow of automobiles, detection of leakage in a pipe line, and the like. Further, it has been examined to apply optical fiber sensing to a system of monitoring an inside of a building. As an application of optical fiber sensing to monitoring of an inside of a building, there is monitoring of a position of a moving body (e.g., a person).

In general, an inside of a building is monitored by using a camera. However, in a case of a camera, a blind spot is generated in some cases, depending on a structure of the building or an installed object inside the building. Thus, optical fiber sensing can be utilized as a technique of complementing a blind spot of a camera. Further, optical fiber sensing is also effective for monitoring a location where a camera cannot be used for a privacy protection reason or a location where quality of an image captured by a camera is degraded due to insufficient lighting.

For monitoring a building with optical fiber sensing, an optical fiber cable (hereinafter, referred to as an "optical cable") that accommodates an optical fiber is used. Vibration and noise that are generated according to motion of a moving body are detected by an optical cable laid in a building, and a position of a generation source of the vibration and noise (i.e., moving body) is monitored, in order to acquire how the moving body moves. For this purpose, the optical cable is laid according to a moving route of the moving body.

PTL 1, which is related to the present invention, describes an optical fiber sensor system that detects distortion or a displacement amount that is associated to a load applied to a structure. Further, PTL 2 describes an intrusion detection system that detects an intruder with an optical fiber installed in a track.

CITATION LIST

Patent Literature

[PTL 1] Japanese Unexamined Patent Application Publication No. 2007-198756
[PTL] Japanese Unexamined Patent Application Publication No. 2005-349892

SUMMARY OF INVENTION

Technical Problem

When the optical cable laid in the building is used for detection of a position of the moving body, a propagation condition of vibration and noise to the optical cable is changed depending on a laying structure of the optical cable as well as a structure of the building and an environmental state such as vibration of an air-conditioning apparatus. For example, even when the same vibration is applied to a floor and a wall of the building, strength and weakness of vibration propagated to the optical cable are changed depending on a position to which vibration is applied in some cases. As a result, there may be a possibility that strong vibration may be detected in the optical cable even at a location that does not receive such strong vibration from the moving body. In an opposite case, there may be a possibility that weak vibration may be detected in the optical cable even though the moving body generates strong vibration. Those cases cause an error in a detected position of the moving body. In the system of monitoring motion of the moving body by using vibration, when such an error is large, there may be a risk that detection accuracy of a position of the moving body is degraded.

Object of Invention

An object of the present invention is to provide a technique for solving a problem that detection accuracy of a position of a moving body is degraded in a position detection system using an optical fiber sensor.

Solution to Problem

A position detection device according to the present invention includes: a transmission means for transmitting an optical pulse to an optical transmission path being laid along a moving route of a moving body; a detection means for detecting back scattered light being generated in response to the optical pulse in the optical transmission path; a data processing means for calculating intensity of the back scattered light and a generation position of the back scattered light; a storage means for storing a processing result of the data processing means; a search range derivation means for deriving a search range for a position of the moving body, based on a moving range of the moving body; a maximum value extraction means for extracting the generation position at which variation of the intensity is maximum in the search range, and storing, in the storage means, the generation position being extracted; and an output means for outputting a result of the extraction in association with a position of the moving body.

A position detection method according to the present invention includes: transmitting an optical pulse to an optical transmission path being laid along a moving route of a moving body; detecting back scattered light being generated in response to the optical pulse in the optical transmission path; calculating intensity of the back scattered light and a generation position of the back scattered light; deriving a search range for a position of the moving body, based on a moving range of the moving body; extracting the generation position at which variation of the intensity is maximum in the search range; and outputting a result of the extraction in association with a position of the moving body.

A recording medium according to the present invention records a program for causing a computer to execute: a procedure of transmitting an optical pulse to an optical transmission path being laid along a moving route of a moving body; a procedure of detecting back scattered light being generated in response to the optical pulse in the optical transmission path; a procedure of calculating intensity of the back scattered light and a generation position of the back scattered light; a procedure of deriving a search range for a position of the moving body, based on a moving range of the moving body; a procedure of extracting the generation position at which variation of the intensity is maximum in the search range; and a procedure of outputting a result of the extraction in association with a position of the moving body.

Advantageous Effects of Invention

The present invention enables suppressing degradation of detection accuracy of a position of a moving body in the position detection system using the optical fiber sensor.

BRIEF DESCRIPTION OF DRAWINGS

FIG. 20 is a flowchart of an operation example of the position detection device 60.

EXAMPLE EMBODIMENT

Example embodiments of the present invention are described below. Arrows in each of the drawings are given as examples for explaining directions of signals or processing in the example embodiments, and are not intended to limit the directions. Elements that are already illustrated in each of the drawings are denoted with identical names and reference symbols, and redundant description therefor is omitted in each of the example embodiments.

First Example Embodiment

Configuration

Figure 1:
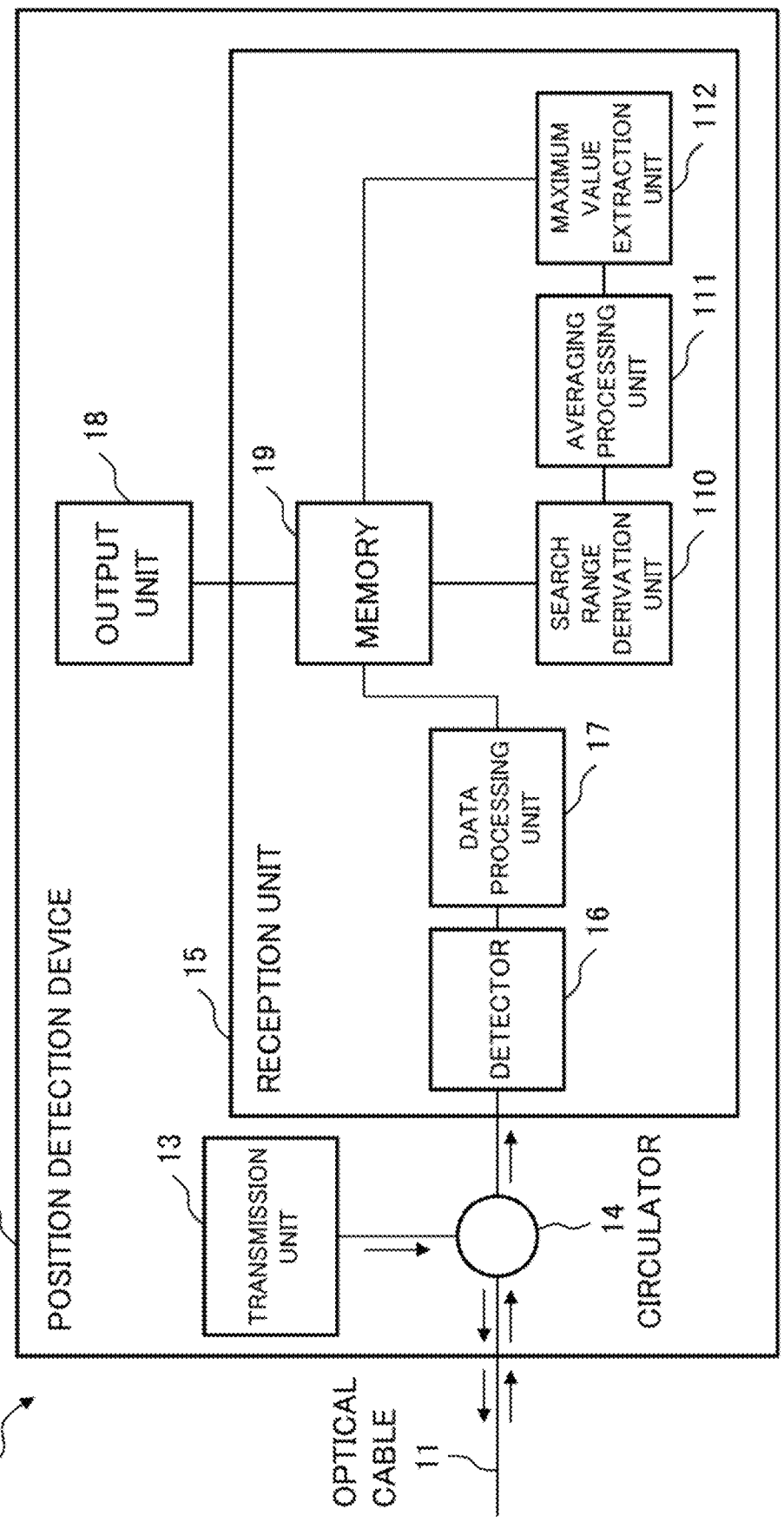
FIG. 1 is a block diagram illustrating a configuration example of a position detection system 10 according to a first example embodiment.

FIG. 1 is a block diagram illustrating a configuration example of a position detection system 10 according to a first example embodiment of the present invention. The position detection system 10 detects a position of a moving body by utilizing optical fiber sensing. The position detection system 10 includes an optical cable 11 and a position detection device 12. The optical cable 11 is a cable that accommodates at least one optical fiber. Vibration of a building, which is generated by movement of the moving body, is propagated to the optical cable 11. The position detection system 10 uses return light of an optical pulse that is input to the optical fiber, and detects vibration applied to the optical cable 11 and temporal variation of the vibration in association with a position at which the vibration is applied.

The position detection device 12 includes a transmission unit 13, a circulator 14, a reception unit 15, and an output unit 18. The reception unit 15 includes a detector 16, a data processing unit 17, a memory 19, a search range derivation unit 110, an averaging processing unit 111, and a maximum value extraction unit 112.

The transmission unit 13 generates an optical pulse, and repeatedly outputs the generated optical pulse to the circulator 14 at a predetermined interval. The circulator 14 is an optical device having three ports. The ports of the circulator 14 are each connected to the transmission unit 13, the reception unit 15, and the optical cable 11 via, for example, an optical fiber or an optical wave guide path. The circulator 14 outputs the optical pulse that is output from the transmission unit 13, to the optical cable 11. Further, the circulator 14 outputs light that is input from the optical cable 11, to the reception unit 15. The optical cable 11 is one example of an optical transmission path. The transmission unit 13 functions as a transmission means for transmitting an optical pulse to the optical transmission path.

Operation

Figure 2:
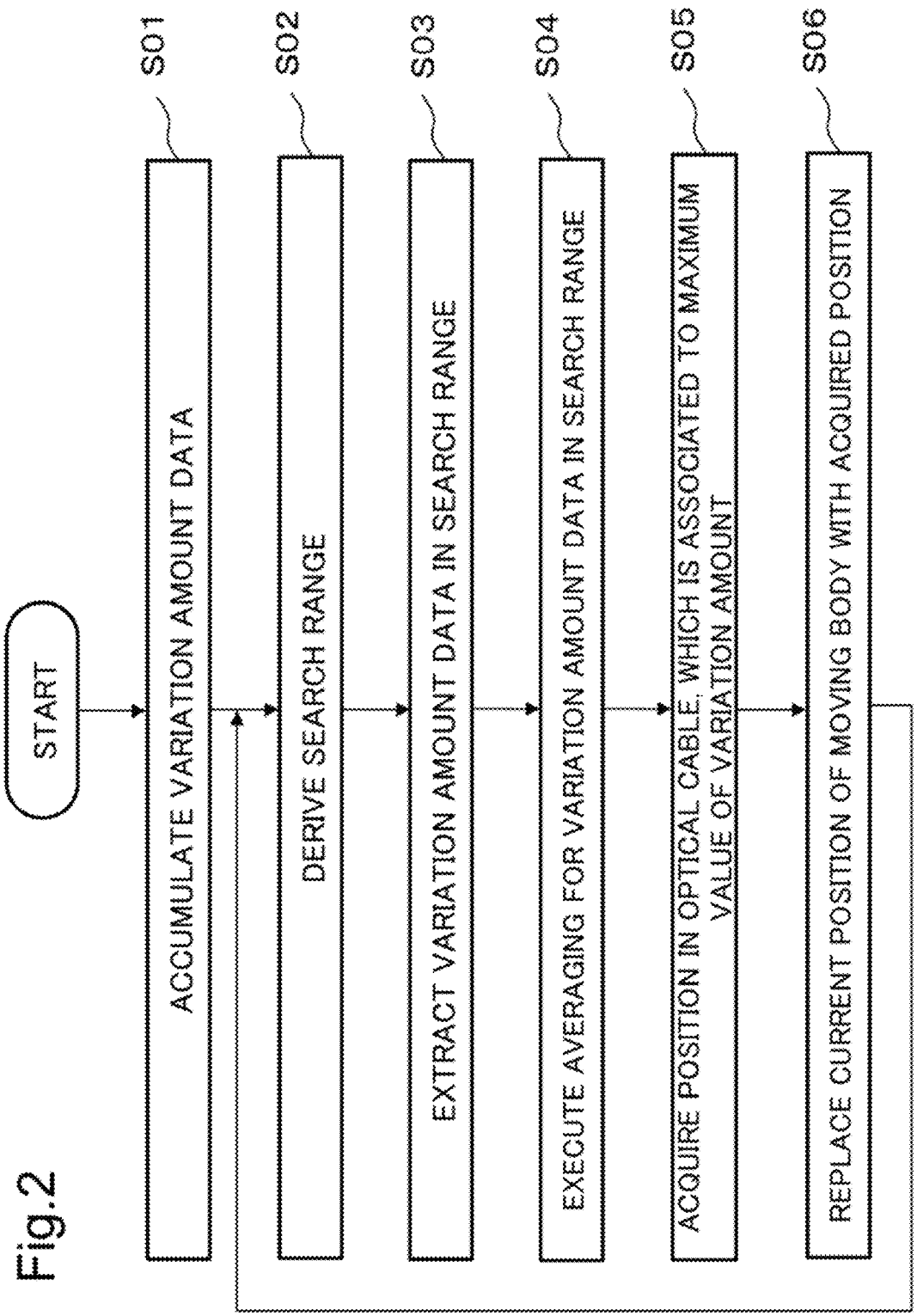
FIG. 2 is a flowchart of an operation example of a position detection device 12.

FIG. 2 is a flowchart of an operation example of the position detection device 12. The operation of the position detection device 12 is described by using FIGS. 1 and 2.

The optical pulse that is output from the transmission unit 13 is output to the optical cable 11 via the circulator 14. When a plurality of optical fibers are accommodated in the optical cable 11, the optical pulse is input to at least one optical fiber.

When the optical pulse is propagated in the optical cable 11, back scattered light is generated due to Rayleigh scattering in the optical fiber in which the optical pulse is propagated. When vibration is applied to the optical cable 11 at the time of generation of back scattering, a parameter (e.g., a refractive index) of the optical fiber is changed. As a result, intensity of the back scattered light generated at a position at which the vibration is applied is changed.

The circulator 14 outputs the back scattered light returning from the optical cable 11, to the detector 16. The detector 16 converts the back scattered light that is detected, into an analog electric signal, and outputs the electric signal to the data processing unit 17. The detector 16 is a photo-electric conversion element, for example, a photodiode. The detector 16 functions as a detection means for detecting the back scattered light generated in response to the optical pulse.

The data processing unit 17 converts the input electric signal to a digital signal, and calculates a variation amount of the light intensity due to the vibration applied to the optical cable 11 and its generation position. For example, the data processing unit 17 is an electric circuit including an analog/digital conversion circuit and a signal processing circuit. The data processing unit 17 functions as a data processing unit for calculating intensity of the back scattered light and a generation position of the back scattered light.

When the optical pulse that is generated by the transmission unit 13 and has a length of T is input to the optical cable 11, the detector 16 detects the back scattered light generated in the optical cable 11. The back scattered light is generated while propagating the optical pulse in the optical cable 11, and hence a period during which back scattered light of one pulse is received by the reception unit 15 is longer than an optical pulse width T. When a propagation time period inside the position detection device 12 is disregarded while regarding a transmission time of the optical pulse as T0 and a detection time of the back scattered light by the detector 16 at a certain point as T1, a distance to the generation position of the back scattered light can be acquired as a half of the light propagation distance from the transmission time T0 to the detection time T1.

The detector 16 transmits optical pulses in a row at such an interval as to prevent back scattered light from being detected in an overlapping manner in the detector 16. The data processing unit 17 measures intensity of back scattered light for each optical pulse while associating the intensity with a detection time of the back scattered light. With this, the data processing unit 17 is capable of calculating variation amount data containing a temporal variation amount of the intensity of the back scattered light in association with the generation position of the back scattered light.

The memory 19 accumulates the calculated variation amount data in association with its generation position for a certain time period (Step S01 in FIG. 2). In the memory 19, an initial position of the moving body is stored as a current position of the moving body. The memory 19 functions as a storage means for storing processing results acquired by the data processing unit 17. For example, the memory 19 is a semiconductor memory. The initial position of the moving body is a position of vibration that is generated when the moving body passes by a starting point of an area (e.g., an entrance of the area) in which the optical cable 11 is laid.

The search range derivation unit 110 derives an area (a search range) in which the moving body is capable of moving from the current position during a time period for which the memory 19 has accumulated the variation amount data (S02). An administrator of the position detection system 10 may store a moving speed of the moving body in the memory 19 in advance. In this case, the search range derivation unit 110 may acquire the search range as a product of the moving speed stored in the memory 19 and the accumulation time period of the variation amount data in the memory 19. Alternatively, the search range may be stored in the memory 19 in advance. Subsequently, the search range derivation unit 110 extracts only variation amount data in the search range, from the variation amount data accumulated in the memory 19 (S03). The search range derivation unit 110 outputs the extracted variation amount data to the averaging processing unit 111. The search range derivation unit 110 functions as a search range derivation means for deriving a search range for a position of the moving body, based on a moving range of the moving body.

The averaging processing unit 111 adjusts the intensity of the back scatted light by a certain value in such a way that, first, an average value M of the intensity of the back scatted light for each predetermined period is M1 in the variation amount data in the search range that is input from the search range derivation unit 110. This processing is also executed in another period in the accumulation time period. Then, the averaging processing unit 111 adjusts a variation amount at each position by a certain value in such a way that an average value of the intensity of the back scattered light is M2 for each position in the optical cable 11. This operation is referred to as "averaging" (S04). Note that M1 and M2 are optional constant values and may be set to values that can be processed by the averaging processing unit 111 and the maximum value extraction unit 112. M1 may differ at each time. M2 may differ at each position. An interval of time and position for executing averaging is not limited. The averaging processing unit 111 outputs the variation amount data that are subjected to averaging, to the maximum value extraction unit 112. The averaging processing unit 111 is one example of an averaging means. The averaging means has a function of equalizing the average values of the intensity contained in the search range and performing outputting.

The maximum value extraction unit 112 acquires a position in the optical cable 11 at which the variation amount of the intensity of the back scattered light is a maximum value in the variation amount data after averaging which are input from the averaging processing unit 111 (S05). Instead of the position, a distance from a starting point of the area in which the optical cable 11 is laid may be expressed. Subsequently, the maximum value extraction unit 112 replaces the current position of the moving body that is stored in the memory 19, with the acquired position (S06). When the current position of the moving body is updated, the memory 19 deletes all the variation amount data and its generation position that are accumulated, and starts accumulation of variation amount data and its generation position which are newly calculated by the data processing unit 17. The maximum value extraction unit 112 is one example of a maximum value extraction means. The maximum value extraction means has a function of extracting a position in the optical cable 11 at which the intensity variation of the back scattered light in the search range is a maximum value and storing the extracted position in the storage means.

The output unit 18 associates an actual position of the moving body with the position in the optical cable 11. When the optical cable 11 is laid under a floor of a room, the actual position of the moving body can be set to a position on the floor. The output unit 18 derives a position in the actual environment, based on the current position of the moving body in the optical cable 11, which is stored in the memory 19, and outputs the position as the position of the moving body, to the outside. Association between the actual position of the moving body and the position in the optical cable 11 may be stored in the output unit 18 or the memory 19. The output unit 18 functions as an output means for outputting an extraction result acquired by the maximum value extraction means, in association with the position of the moving body.

Figure 3:
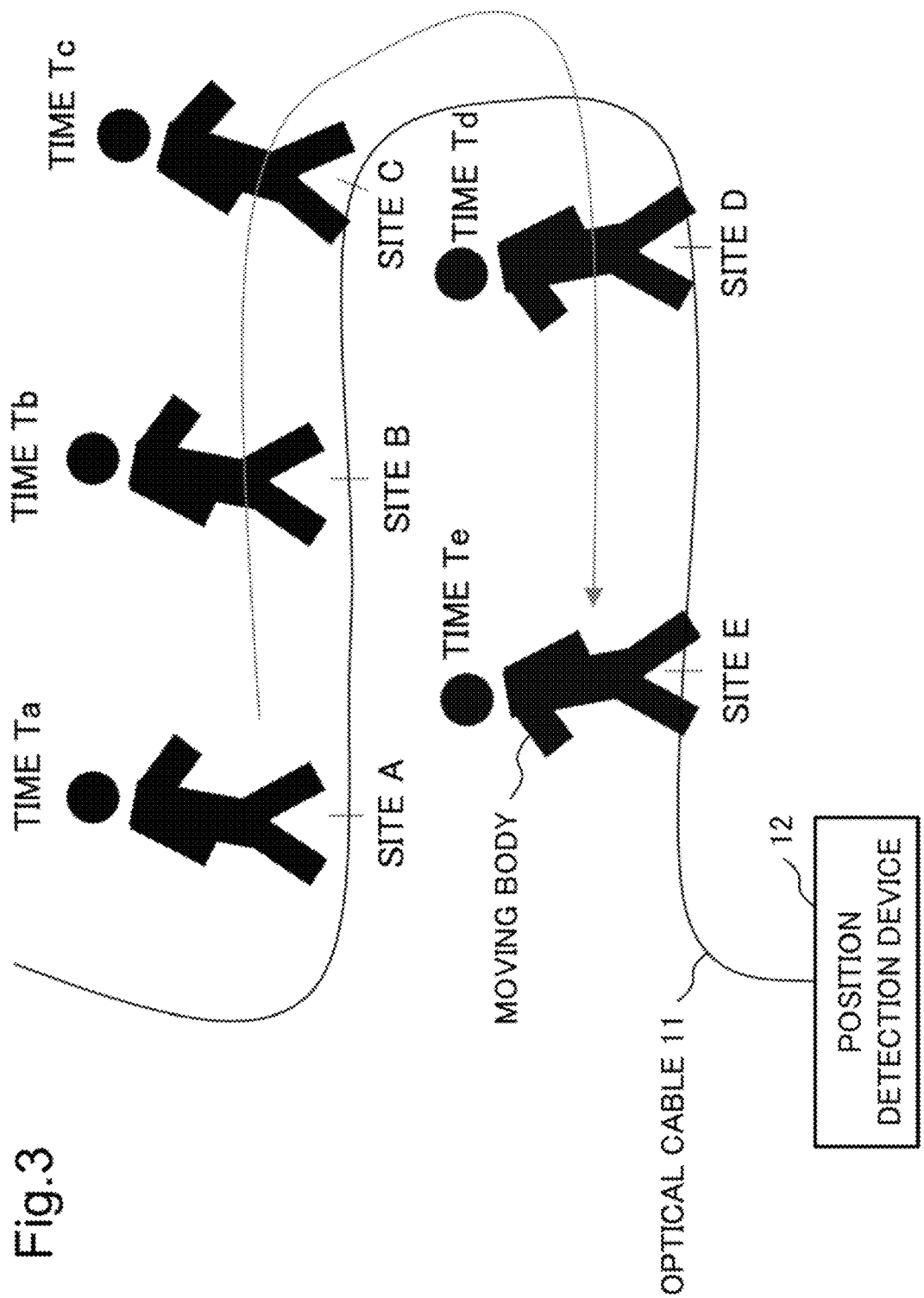
FIG. 3 is a diagram exemplifying a state in which a moving body moves along an optical cable 11.
Figure 4:
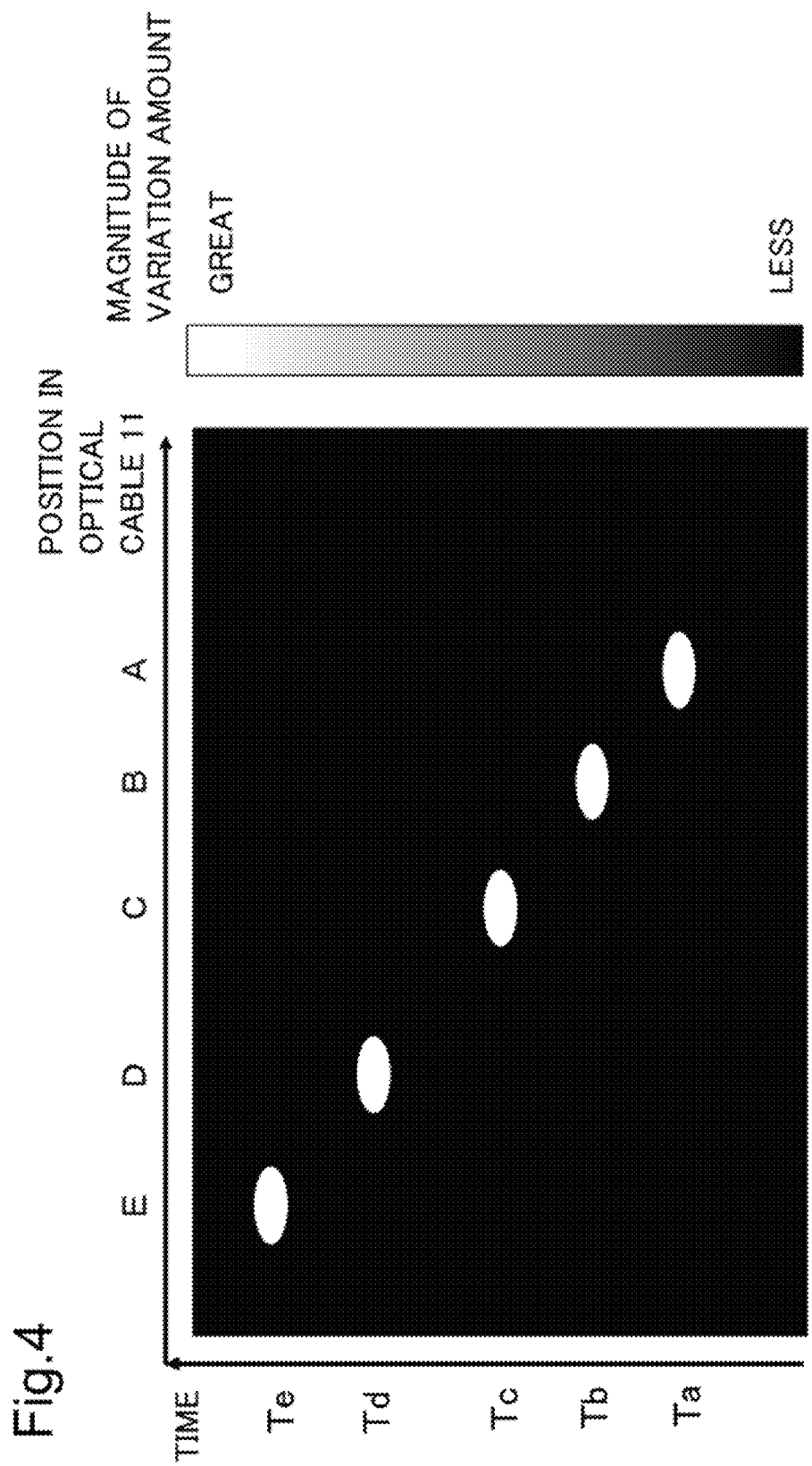
FIG. 4 is a diagram illustrating an example of variation amount data acquired when vibration is detected in an ideal manner.
Figure 5:
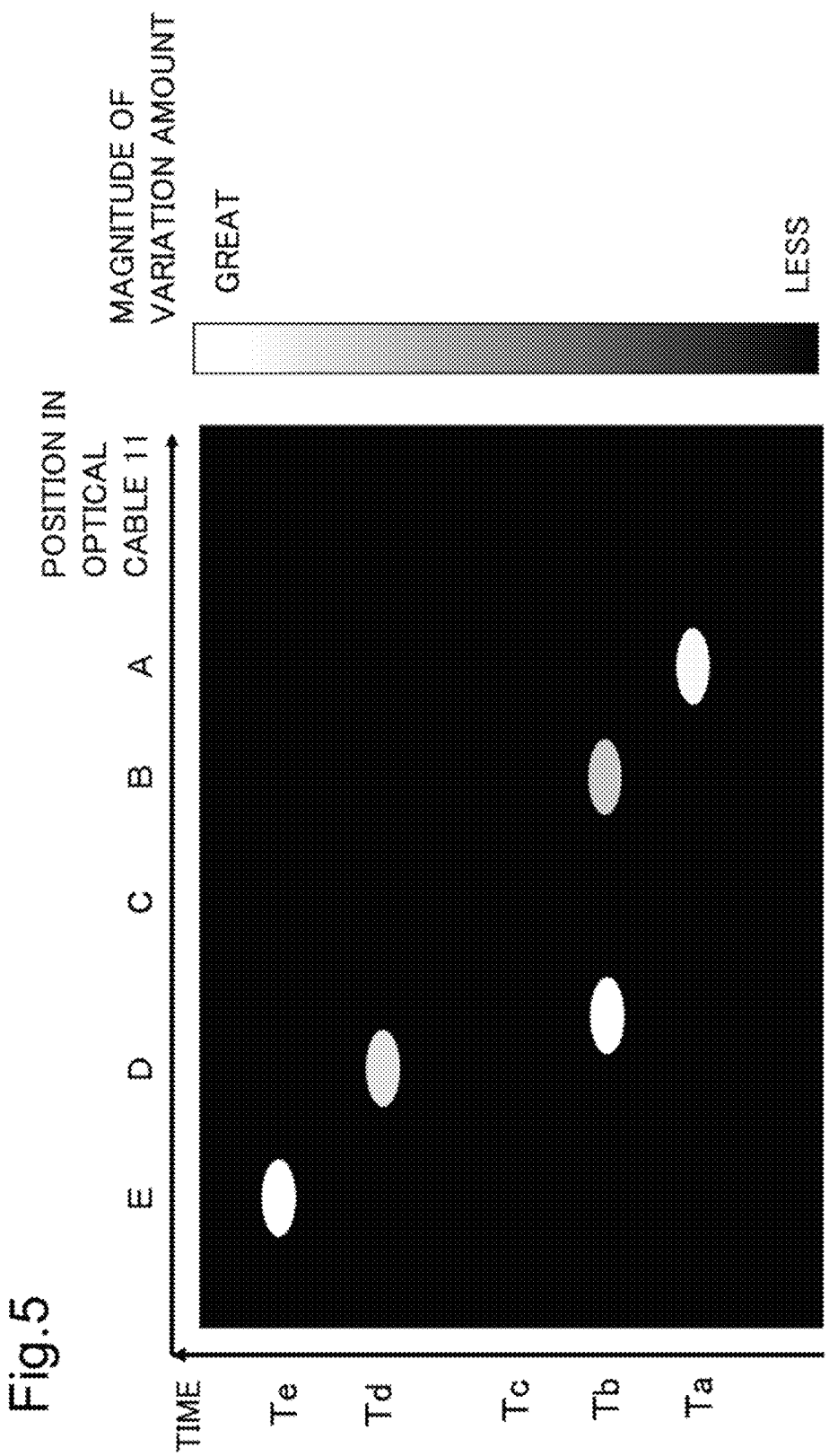
FIG. 5 is a diagram illustrating an example of variation amount data acquired when vibration is detected in an actual state.

FIG. 3 is a diagram exemplifying a state in which the moving body moves along the optical cable 11. FIG. 4 is a diagram illustrating an example of variation amount data acquired when vibration is detected in an ideal manner. FIG. 5 is a diagram illustrating an example of variation amount data acquired when vibration is detected in an actual state. In FIGS. 4 to 7, FIG. 10, and FIG. 11, a time and a position at which a variation amount of detected light intensity is larger are illustrated to be whiter (brighter). Further, in each of the drawings, the vertical axis indicates a time, and the horizontal axis with the position detection device 12 as the original point indicates a position in the optical cable 11.

Ideally, when the moving body (person) moves in a path along the optical cable 11 as in FIG. 3, the vibration of the moving body is detected at points at which positions A to E of the moving body and times Ta to Te therefor match with each other as in FIG. 4. However, depending on a laying condition of the optical cable 11, the vibration is detected at two spots being the positions B and D at the time Tb as illustrated in FIG. 5, or no vibration is detected at the time Tc in some cases. In such a situation, the position of the moving body cannot be acquired accurately.

Figure 6:
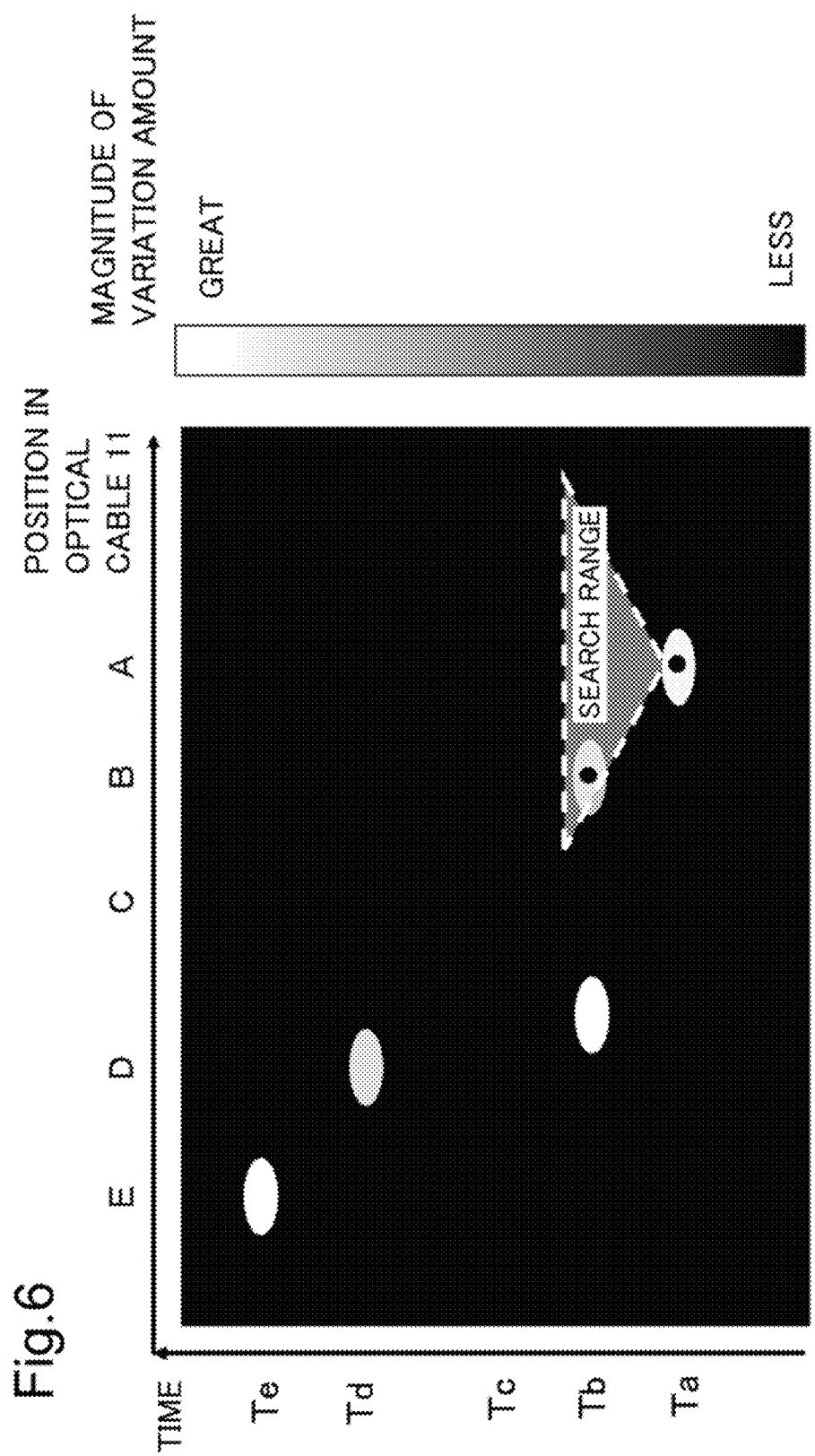
FIG. 6 is a diagram explaining detection of a position of the moving body, based on a search range.
Figure 7:
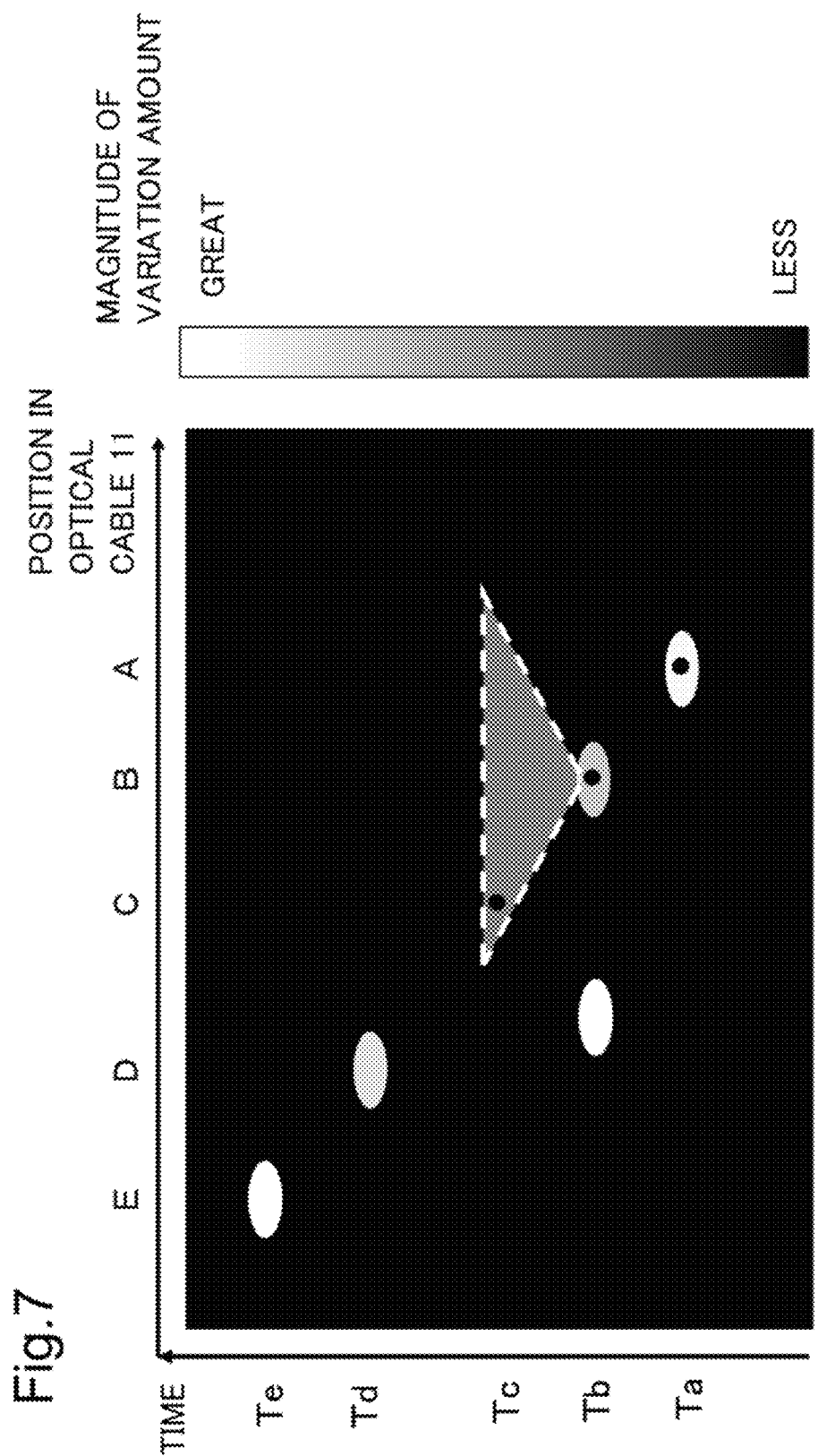
FIG. 7 is a diagram explaining detection of a position of the moving body, based on the search range.

FIGS. 6 and 7 are diagrams each explaining detection of the position of the moving body, based on a search range. Black circle marks at the positions A and B in FIG. 6 and the positions A to C in FIG. 7 have the maximum variation amounts at the positions and the times, and hence indicate that the positions may be determined as positions of the moving body. In FIG. 5, the variation amount at the position B at the time Tb is smaller than those at the positions A, D, and E. FIG. 6 illustrates that, because the search range is limited, the position B of the moving body at the time Tb can be detected without being affected by the variation amount data at the positions D and E. FIG. 7 illustrates that the position C of the moving body at the time Tc can be further detected based on the position B that is detected in FIG. 6.

Effects

The position detection system 10 limits the search range for the position of the moving body to a range in which the moving body can move within an accumulation time period in the variation amount data. Then, the variation amount data accumulated in the time period is subjected to averaging processing, and it is determined that variation having the maximum variation amount of the intensity of the back scattered light in the range is associated to the vibration generated along with the movement of the moving body. With this, for example, an influence of vibration that is detected intensely due to resonance caused by a mounting state of the optical fiber cable or a building structure can be reduced. Further, averaging processing facilitates comparison of the variation amount of the vibration.

In other words, the position detection system 10 according to the present example embodiment can suppress degradation of detection accuracy of the position of the moving body.

In the description given above, the position having the maximum value in the search range is regarded as the position of the moving body, which is given as an example. However, the current position of the moving body may be determined by detecting a plurality of vibrations independently in the search range, extracting a position having a maximum value for each of the vibrations, and selecting a position for which a subsequent associated moving position can be found. With this, even when a plurality of vibrations are detected in the search range, monitoring of the moving body is enabled.

Second Example Embodiment

Configuration

Figure 8:
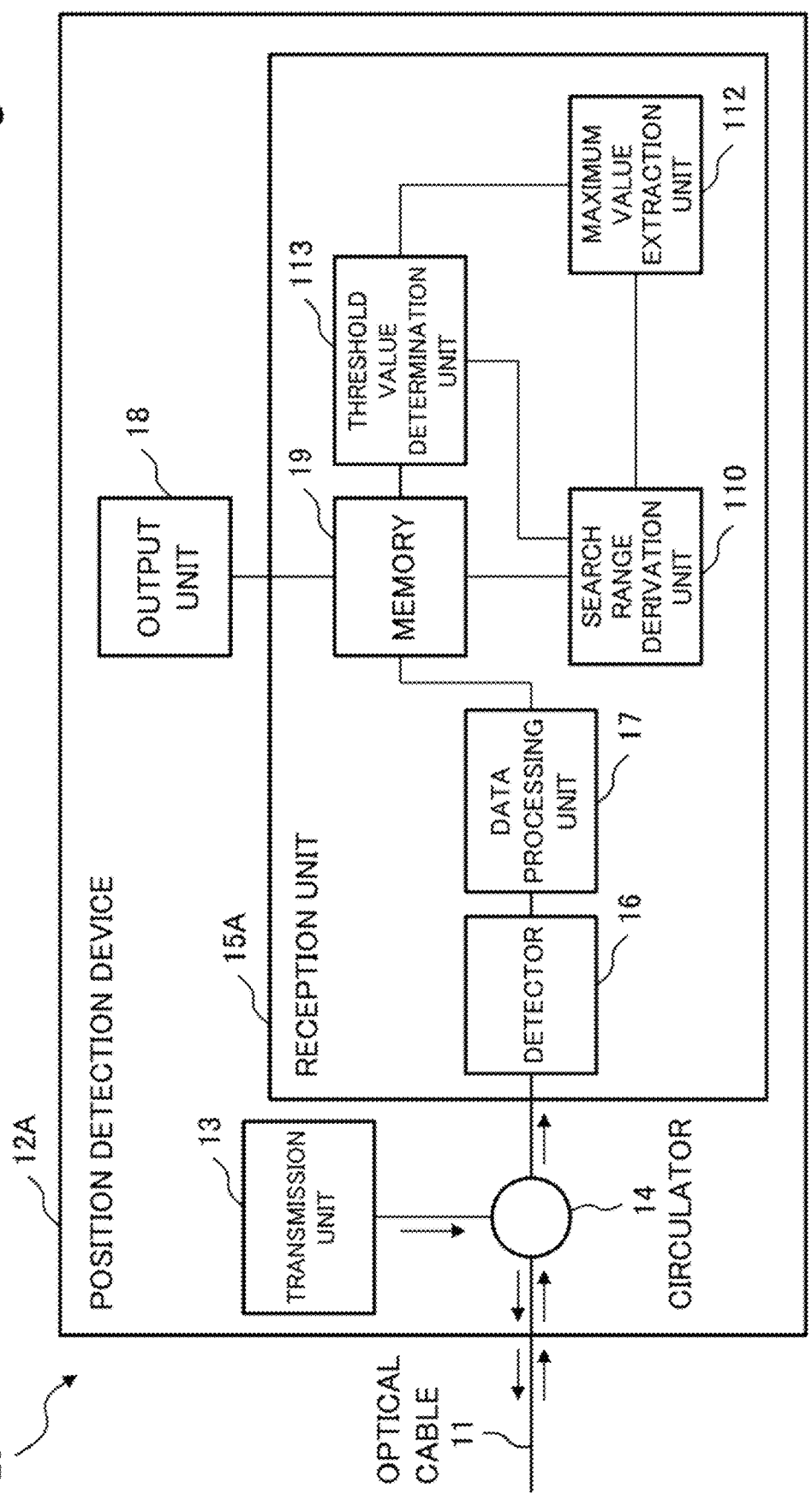
FIG. 8 is a block diagram illustrating a configuration example of a position detection system 20 according to a second example embodiment.
Figure 9:
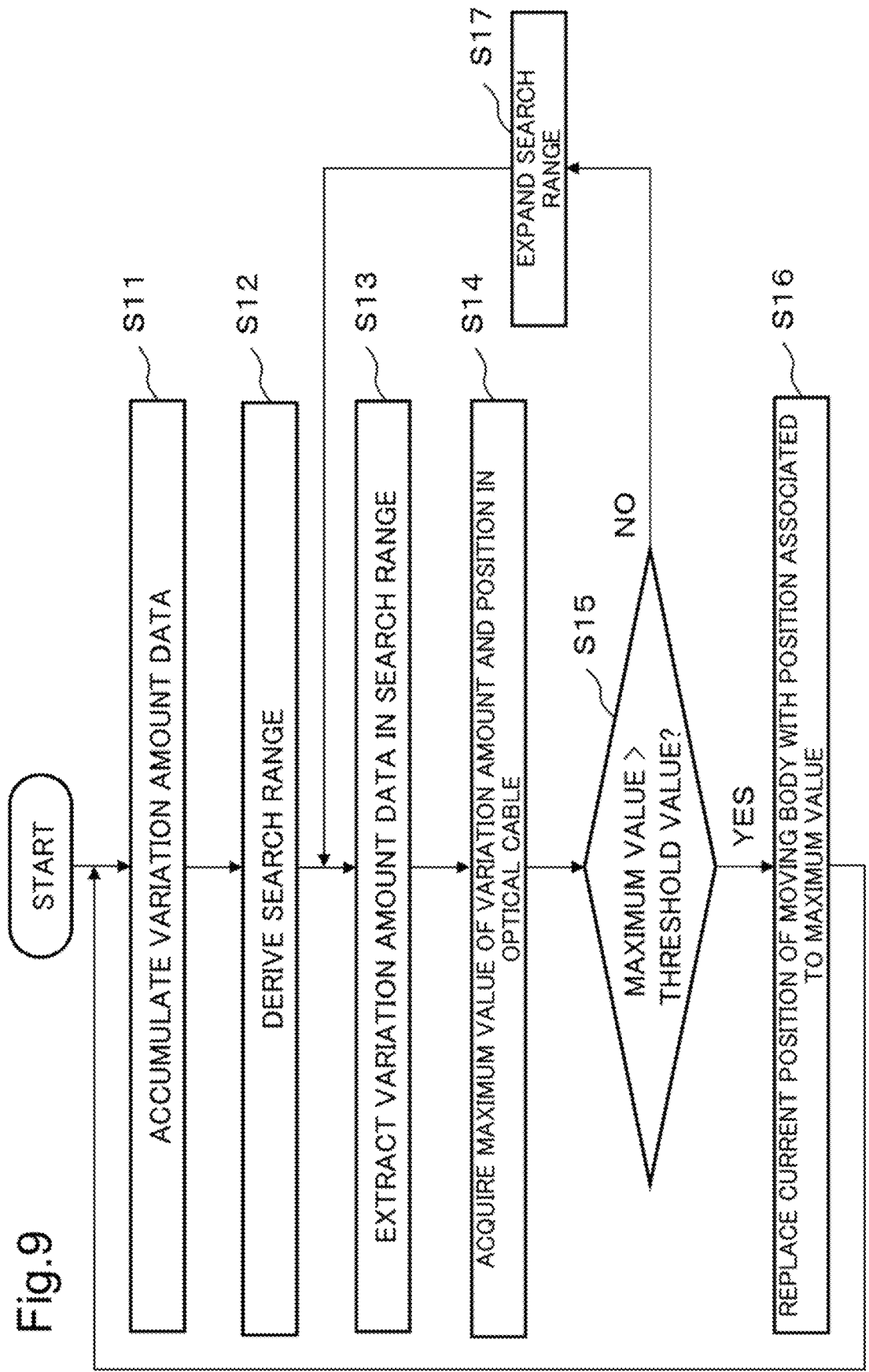
FIG. 9 is a flowchart of an operation example of a position detection device 12A.

FIG. 8 is a block diagram illustrating a configuration example of a position detection system 20 according to a second example embodiment. FIG. 9 is a flowchart of an operation example of a position detection device 12A.

The position detection system 20 includes an optical cable 11 and the position detection device 12A. The position detection device 12A includes a transmission unit 13, a circulator 14, a reception unit 15A, and an output unit 18. The reception unit 15A is different from the reception unit 15 illustrated in FIG. 1 in that a threshold value determination unit 113 is included instead of the averaging processing unit 111. Configurations and functions of other components of the position detection system 20 are similar to those of the position detection system 10. Further, descriptions overlapping with the first example embodiment are omitted as appropriate.

Operation

By using FIGS. 8 and 9, an operation of the position detection device 12A is described. The optical pulse that is output from the transmission unit 13 is output to the circulator 14. The circulator 14 outputs the optical pulse that is transmitted from the transmission unit 13, to the optical cable 11. The circulator 14 outputs back scattered light returning from the optical cable 11, to the detector 16. The detector 16 converts the back scattered light that is detected, into an analog electric signal, and outputs the electric signal to a data processing unit 17. The data processing unit 17 converts the input electric signal to a digital signal, and calculates a variation amount of intensity of the back scattered light due to vibration applied to the optical cable 11 and its generation position.

A memory 19 accumulates the calculated variation amount data in association with its generation position for a certain time period (Step S11 in FIG. 9). The memory 19 stores an initial position of the moving body as the current position of the moving body.

The search range derivation unit 110 derives an area (search range) in which the moving body can move from the current position during an accumulation time period for the variation amount data (S12), and extracts only the variation amount data in the search range (S13). The derivation of the search range may be acquired as a product of the accumulation time period for the data and the moving speed of the moving body. The maximum value extraction unit 112 acquires a maximum value of the variation amount of the intensity of the back scattered light, from among the extracted variation amount data and the position in the optical cable 11, the position being associated to the maximum value thereof (S14), and outputs those resultants to the threshold value determination unit 113.

The maximum value of the variation amount of the intensity of the back scattered light and the position in the optical cable 11, the position being associated to the maximum value thereof, are input from the maximum value extraction unit 112 to the threshold value determination unit 113. The threshold value determination unit 113 compares a pre-set threshold value with the maximum value of the variation amount in the search range (S15). An administrator of the position detection system 20 may store the threshold value in the memory 19. In this case, the threshold value determination unit 113 reads out the threshold value from the memory 19. When the maximum value exceeds the threshold value (S15:YES), the threshold value determination unit 113 outputs the position associated to the maximum value to the memory 19, and replaces the current position of the moving body, which is stored in the memory 19, with the position associated to the maximum value (S16). When the maximum value does not exceed the threshold value (S15: NO), the search range derivation unit 110 expands the search range, and repeats the search procedure (S17). When the current position of the moving body is updated in Step S16, the memory 19 deletes all the variation amount data and its generation position that are accumulated, and starts accumulation of the variation amount data and its generation position that are newly calculated by the data processing unit 17 (S11).

The output unit 18 associates the actual position of the moving body with the position in the optical cable 11. The output unit 18 derives a position in the actual environment, based on the current position of the moving body in the optical cable 11, which is stored in the memory 19, and outputs the position as the position of the moving body, to the outside.

Figure 10:
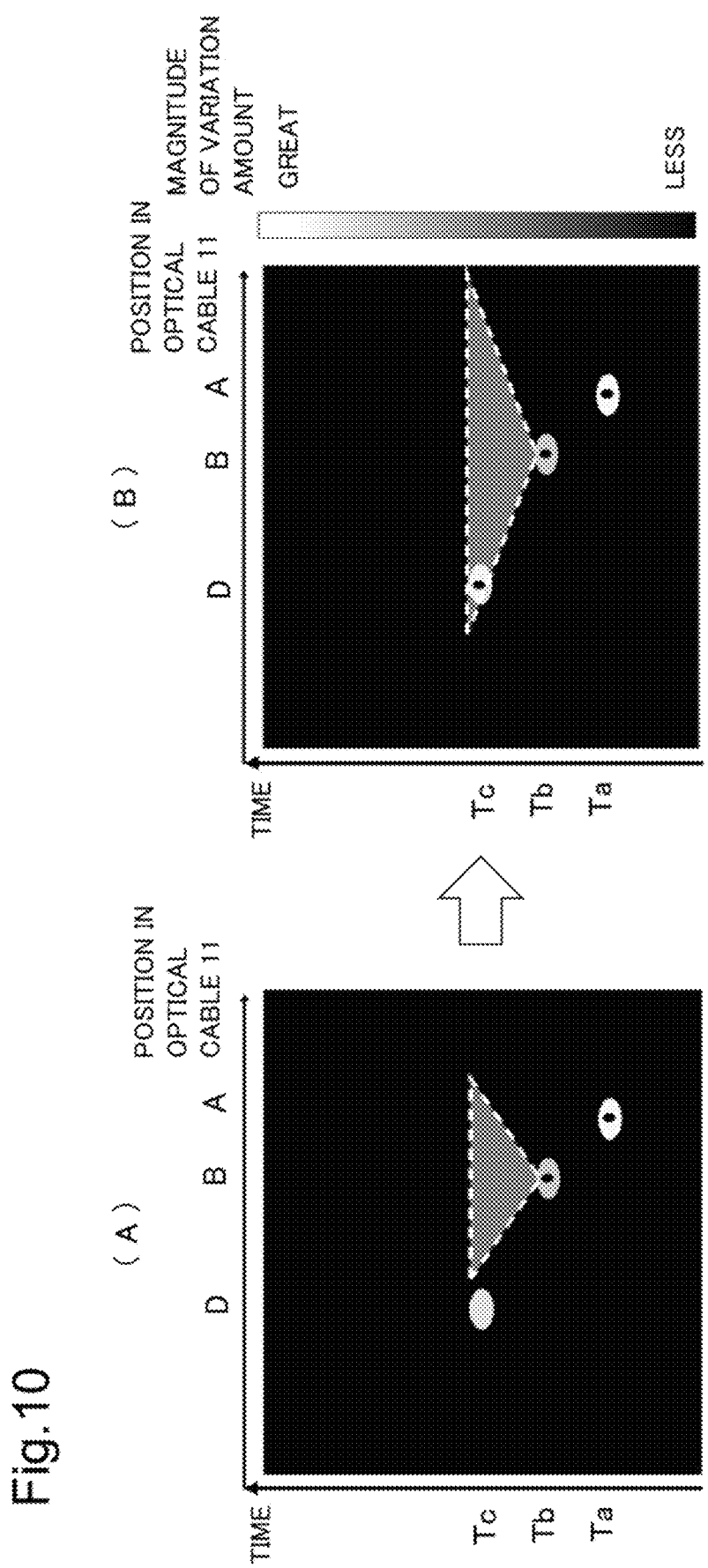
FIG. 10 is a diagram illustrating an example of processing of expanding the search range in a position direction.

FIG. 10 is a diagram explaining processing of expanding the search range in a position direction. Similarly to FIGS. 3 to 7, the horizontal axis indicates a position in the optical cable 11, and the vertical axis indicates a time. In (A) of FIG. 10, the search range is narrow, and hence a position at which the maximum value of the variation amount exceeds the threshold value is not detected. However, when the search range is expanded to a site D in the position direction as in (B) of FIG. 10, the site D can be determined as the position of the moving body.

Figure 11:
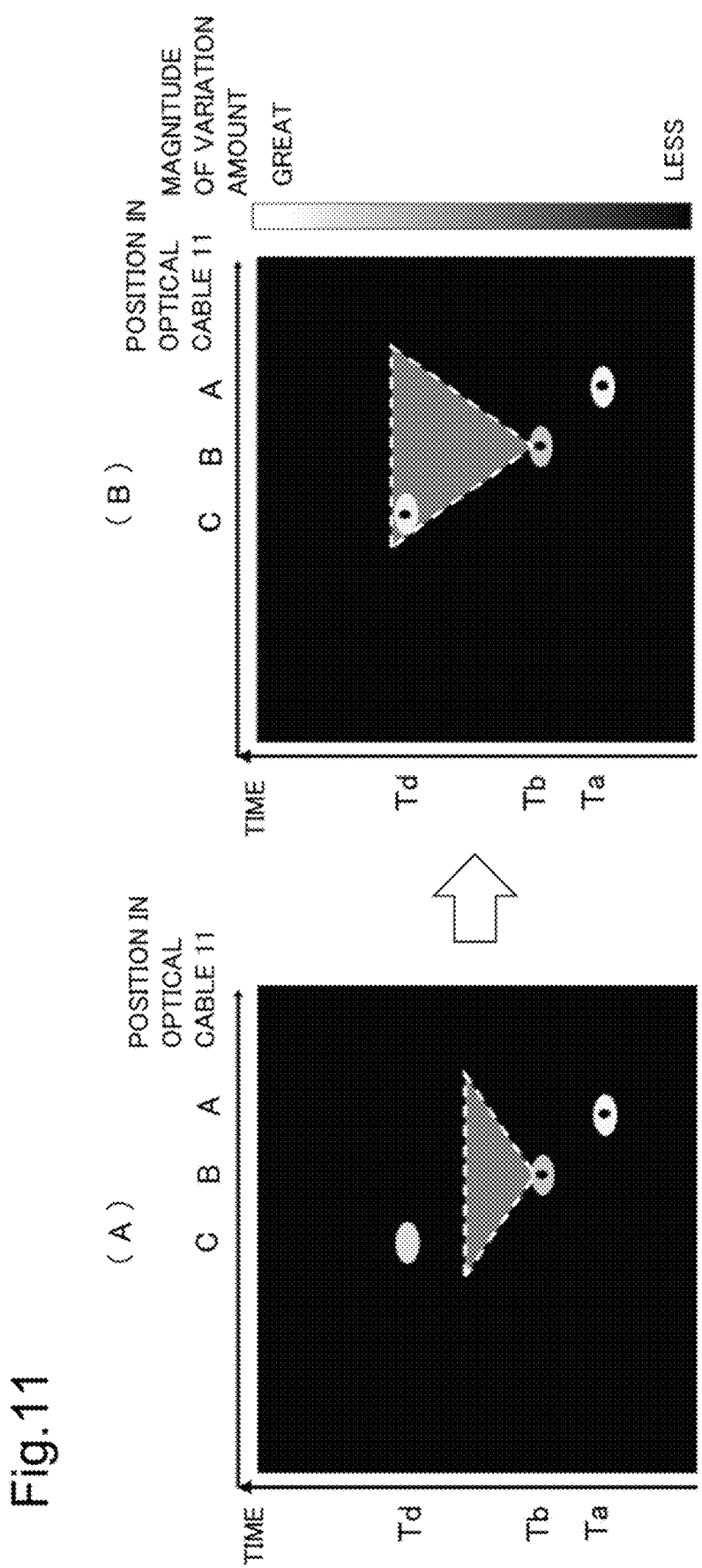
FIG. 11 is a diagram illustrating an example of processing of expanding the search range in a time direction.

FIG. 11 is a diagram explaining processing of expanding the search range in a time direction. FIG. 11 illustrates an example in which the search range is expanded in the position direction, but the search range may also be expanded in the time direction as in (B) of FIG. 11, as well as in the position direction. (B) of FIG. 11 illustrates that a site C can be determined as the position of the moving body by expanding the search range to the time Td.

Effects

When the maximum value of the variation amount does not exceed the threshold value, the position detection system 20 according to the present example embodiment expands the search range, and searches for data in which a maximum value exceeds a variation amount. Thus, in addition to the effects of the position detection system 10, the position detection system 20 can detect the position of the moving body by expanding the search range even when vibration is not detected in the initial search range because of increase or decrease in the speed of the moving body.

The first and the second example embodiments illustrate a mode in which the position at which the variation amount of the intensity of the back scattered light in the search range is maximum is regarded as the position of the moving body. However, the current position of the moving body may be determined by determining the number of distinguishable vibrations in the search range and extracting a position having a maximum value for each of the vibrations, and selecting a position for which a subsequent moving position can be found. With this, even when a plurality of vibrations is detected in the search range, monitoring of the moving body is enabled.

Third Example Embodiment

Configuration

Figure 12:
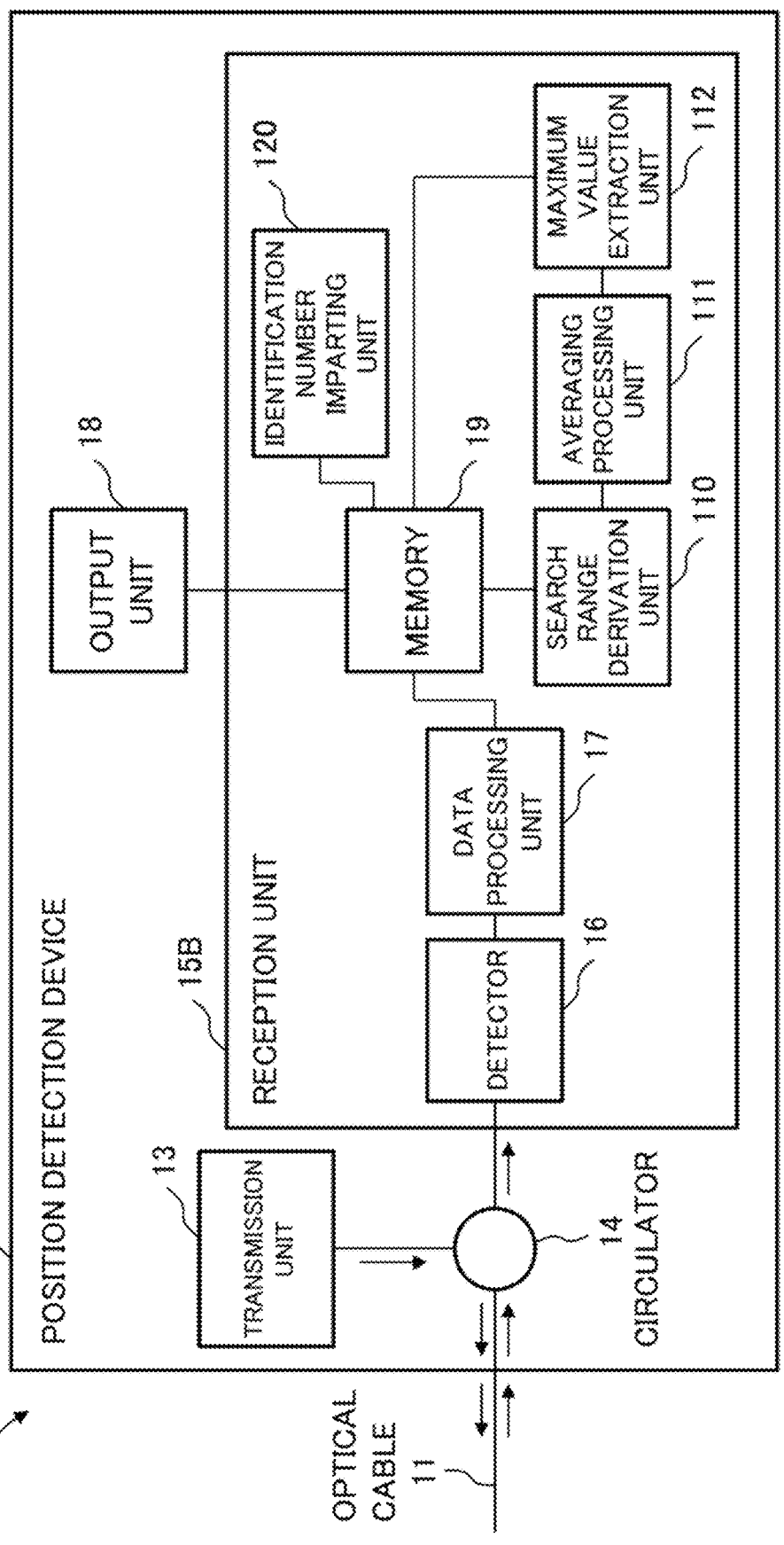
FIG. 12 is a block diagram illustrating a configuration example of a position detection system 30 according to a third example embodiment.
Figure 13:
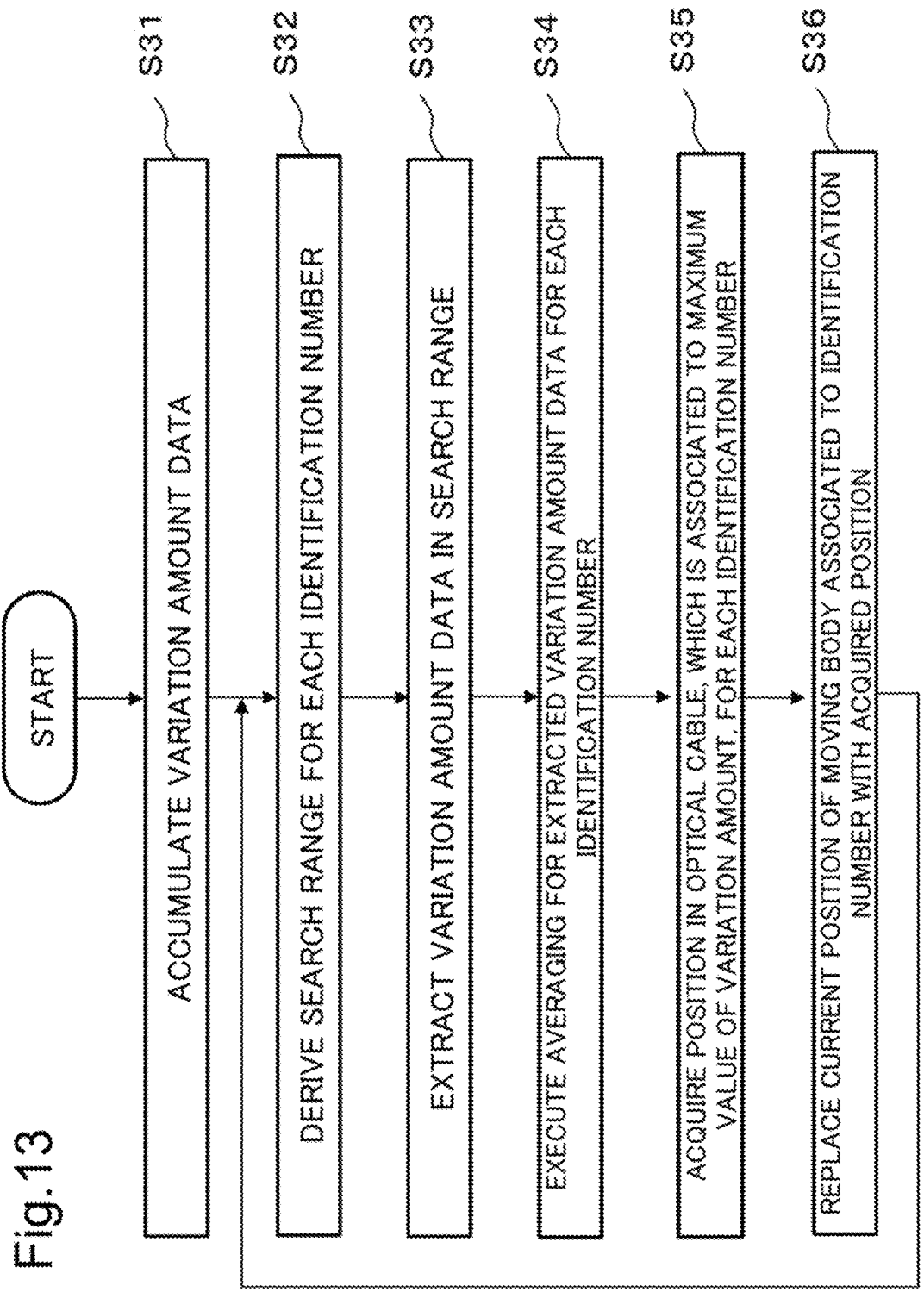
FIG. 13 is a flowchart of an operation example of a position detection device 12B.

FIG. 12 is a block diagram illustrating a configuration example of a position detection system 30 according to a third example embodiment. FIG. 13 is a flowchart of an operation example of a position detection device 12B.

The position detection system 30 includes an optical cable 11 and the position detection device 12B. The position detection device 12B includes a transmission unit 13, a circulator 14, a reception unit 15B, and an output unit 18. The reception unit 15B is different from the reception unit 15 illustrated in FIG. 1 in that an identification number imparting unit 120 connected to the memory 19 is included. Configurations and functions of other components of the position detection system 30 are similar to those of the position detection system 10. Further, descriptions overlapping with the first example embodiment are omitted as appropriate.

Operation

An operation of the position detection system 30 is described by using FIGS. 12 and 13. The optical pulse that is output from the transmission unit 13 is output to the circulator 14. The circulator 14 outputs the optical pulse that is transmitted from the transmission unit 13, to the optical cable 11. The circulator 14 outputs back scattered light returning from the optical cable 11, to the detector 16. The detector 16 converts the back scattered light that is detected, into an analog electric signal, and outputs the electric signal to the data processing unit 17. The data processing unit 17 converts the input electric signal to a digital signal, and calculates a variation amount of intensity of the back scattered light due to vibration applied to the optical cable 11 and its generation position.

The memory 19 accumulates the calculated variation amount data in association with its generation position for a certain time period (Step S31 in FIG. 13). The identification number imparting unit 120 issues an identification number whenever the moving body passes by an entrance of an area in which the optical cable 11 is laid. The identification number is a number capable of identifying a plurality of moving bodies. For example, the identification number imparting unit 120 issues an identification number that is not used in the past whenever the moving body passes by the entrance. The memory 19 stores a position of vibration generated when the moving body passes by the entrance as the current position of the moving body with the identification number.

The search range derivation unit 110 derives an area (search range) in which the moving body can move at the moving speed in a data accumulation time from the current position of the moving body, for each identification number (S32), and extracts only the variation amount data in the search range (S33). The averaging processing unit 111 subjects the variation amount data extracted by the search range derivation unit 110, to averaging processing, for each identification number (S33). Averaging processing in Step S33 is similar to averaging processing in Step S04 in FIG. 2.

The maximum value extraction unit 112 acquires the position in the optical cable 11 at which the variation amount is a maximum value in the variation amount data after averaging processing is executed, for each identification number (S35). Subsequently, the maximum value extraction unit 112 replaces the current position of the moving body associated to the identification number, which is stored in the memory 19, with the acquired position (S36).

The output unit 18 associates the actual position of the moving body, which is associated to the identification number, with the position in the optical cable 11. The output unit 18 derives a position in the actual environment, based on the current position of the moving body in the optical cable 11, which is stored in the memory 19, for each identification number, and outputs the position as the position of the moving body, to the outside.

Effects

The position detection system 30 according to the present example embodiment can monitor a position change of vibration for each identification number by imparting an identification number to the moving body. As a result, in addition to the effects of the position detection system 10 according to the first example embodiment, the position detection system 30 exerts an effect that a plurality of moving bodies can be monitored.

Fourth Example Embodiment

Configuration

Figure 14:
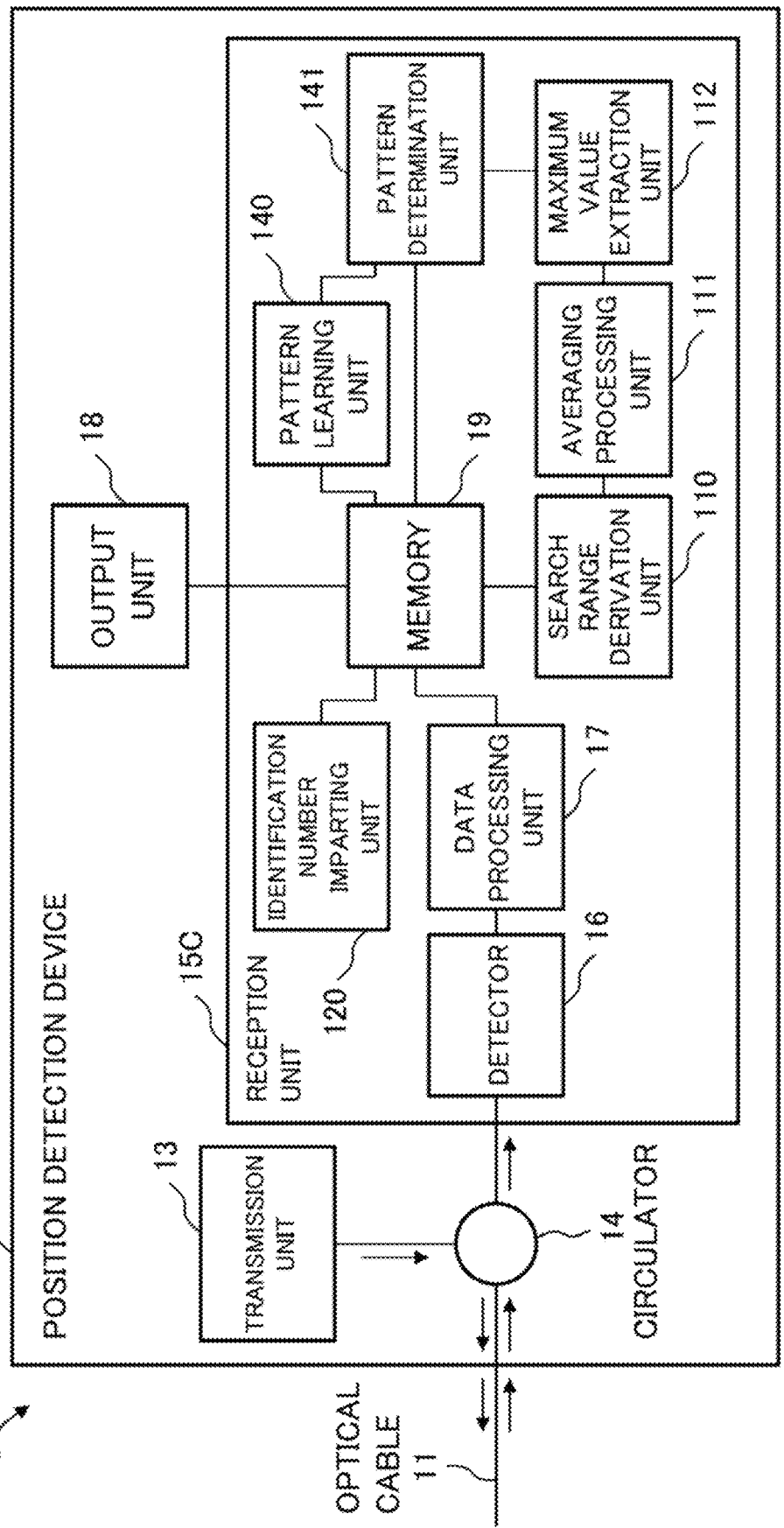
FIG. 14 is a block diagram illustrating a configuration example of a position detection system 40 according to a fourth example embodiment.
Figure 15:
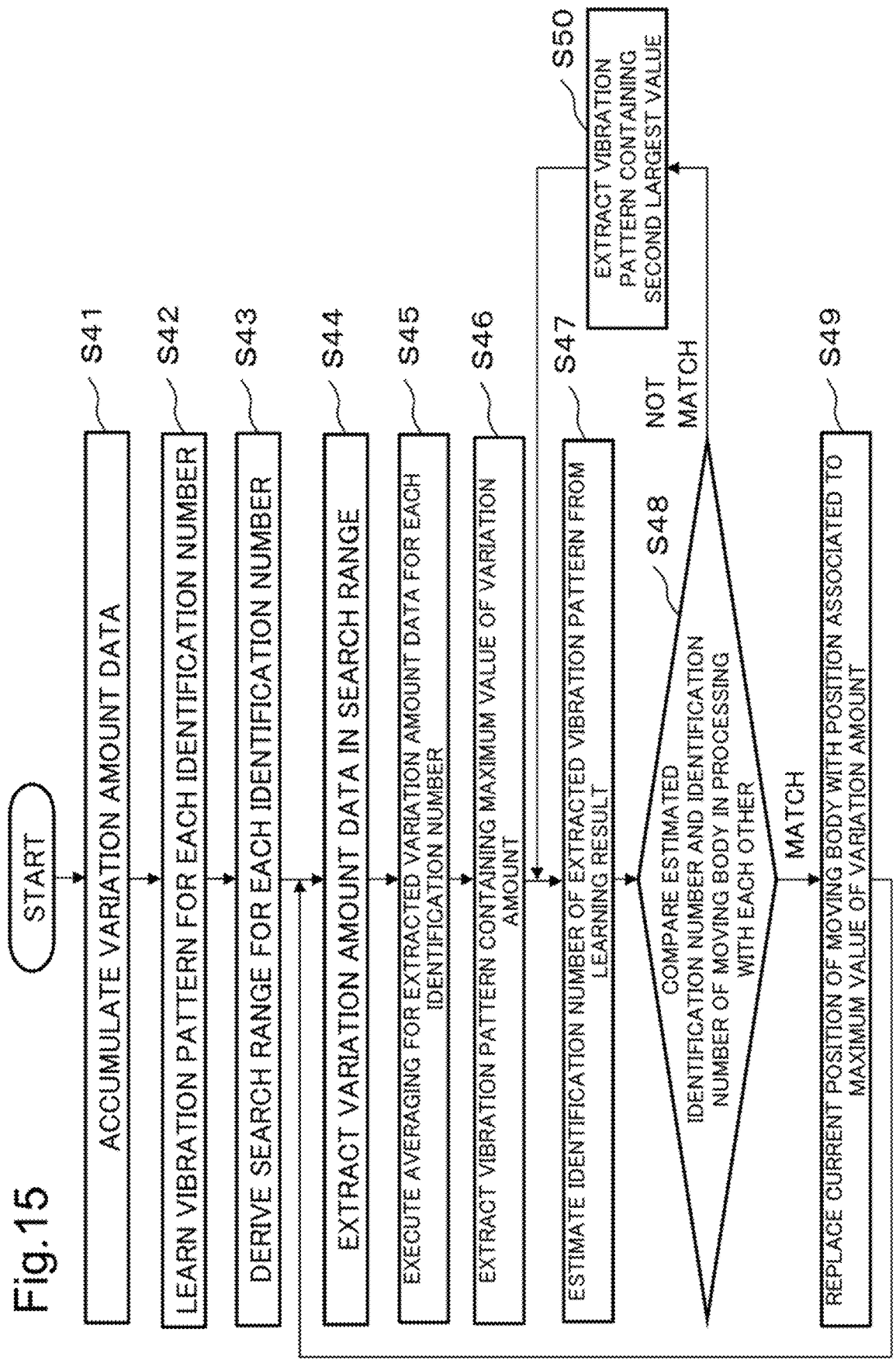
FIG. 15 is a flowchart of an operation example of a position detection device 12C.

FIG. 14 is a block diagram illustrating a configuration example of a position detection system 40 according to a fourth example embodiment. FIG. 15 is a flowchart of an operation example of a position detection device 12C.

The position detection system 40 includes an optical cable 11 and the position detection device 12C. The position detection device 12C includes a transmission unit 13, a circulator 14, a reception unit 15C, and an output unit 18. The reception unit 15C is different from the reception unit 15B of the position detection system 30 illustrated in FIG. 12 in that a pattern learning unit 140 and a pattern determination unit 141 are further included. Configurations and functions of other components of the position detection system 40 are similar to those of the position detection system 30.

Operation

An operation of the position detection system 40 is described by using FIGS. 14 and 15. An optical pulse that is output from the transmission unit 13 is output to the circulator 14. The circulator 14 outputs the optical pulse that is transmitted from the transmission unit 13, to the optical cable 11. The circulator 14 outputs back scattered light returning from the optical cable 11, to the detector 16. The detector 16 converts the back scattered light that is detected, into an analog electric signal, and outputs the electric signal to the data processing unit 17. The data processing unit 17 converts the input electric signal to a digital signal, and calculates a variation amount of intensity of the back scattered light due to vibration applied to the optical cable 11 and its generation position.

The memory 19 accumulates the calculated variation amount data in association with its generation position for a certain time period (Step S41 in FIG. 15). Whenever the moving body passes by an entrance of an area in which the optical cable 11 is laid, an identification number imparting unit 120 issues a number that does not overlap with identification numbers previously issued. The memory 19 stores the position of the vibration generated when the moving body passes by the entrance as the current position of the moving body, with the identification number issued by the identification number imparting unit 120.

The pattern learning unit 140 learns a vibration pattern being distribution of the variation amount of the light intensity due to vibration generated by movement of the moving body, while regarding the identification number as a label (S42). The search range derivation unit 110 derives an area (search range) in which the moving body can move at the moving speed in a data accumulation time from the current position of the moving body, for each identification number (S43), and extracts only the variation amount data in the search range (S44). Similarly to Step S34 in FIG. 13, the averaging processing unit 111 executes averaging processing for each identification number (S45).

A maximum value extraction unit 112 extracts a position in the optical cable 11 at which the variation amount is maximum in the variation amount data extracted by the search range derivation unit 110 and a vibration pattern containing the variation amount, for each identification number (S46).

The pattern determination unit 141 estimates an identification number of the extracted vibration pattern in contrast to learning results (S47), and compares the estimated identification number and the identification number of the moving body in processing with each other (S48). When the identification number in processing and the estimated identification number match with each other, the current position of the moving body stored in the memory 19 is replaced with the position in the optical cable 11 at which the variation amount is maximum in Step S46 (S49). When the identification numbers do not match with each other, the maximum value extraction unit 112 extracts a position in the optical cable 11 at which the variation amount is the second largest and a vibration pattern containing the variation amount (S50), and determination is performed again by the pattern determination unit 141 (S47).

The output unit 18 associates the actual position of the moving body, which is associated to the identification number, with the position in the optical cable 11. The output unit 18 derives a position in the actual environment, based on the current position of the moving body in the optical cable 11, which is stored in the memory 19, for each identification number, and outputs the position as the position of the moving body, to the outside.

Effects

The position detection system 40 according to the fourth example embodiment can monitor a position change of vibration generated by a plurality moving bodies for each moving body by learning a pattern of vibration generated by motion of the moving body. Thus, the position detection system 40 can monitor complex motion such as collision, approaching, and intersection of a plurality of moving bodies, in addition to the effects of the position detection system 30 according to the third example embodiment.

Fifth Example Embodiment

Configuration

Figure 16:
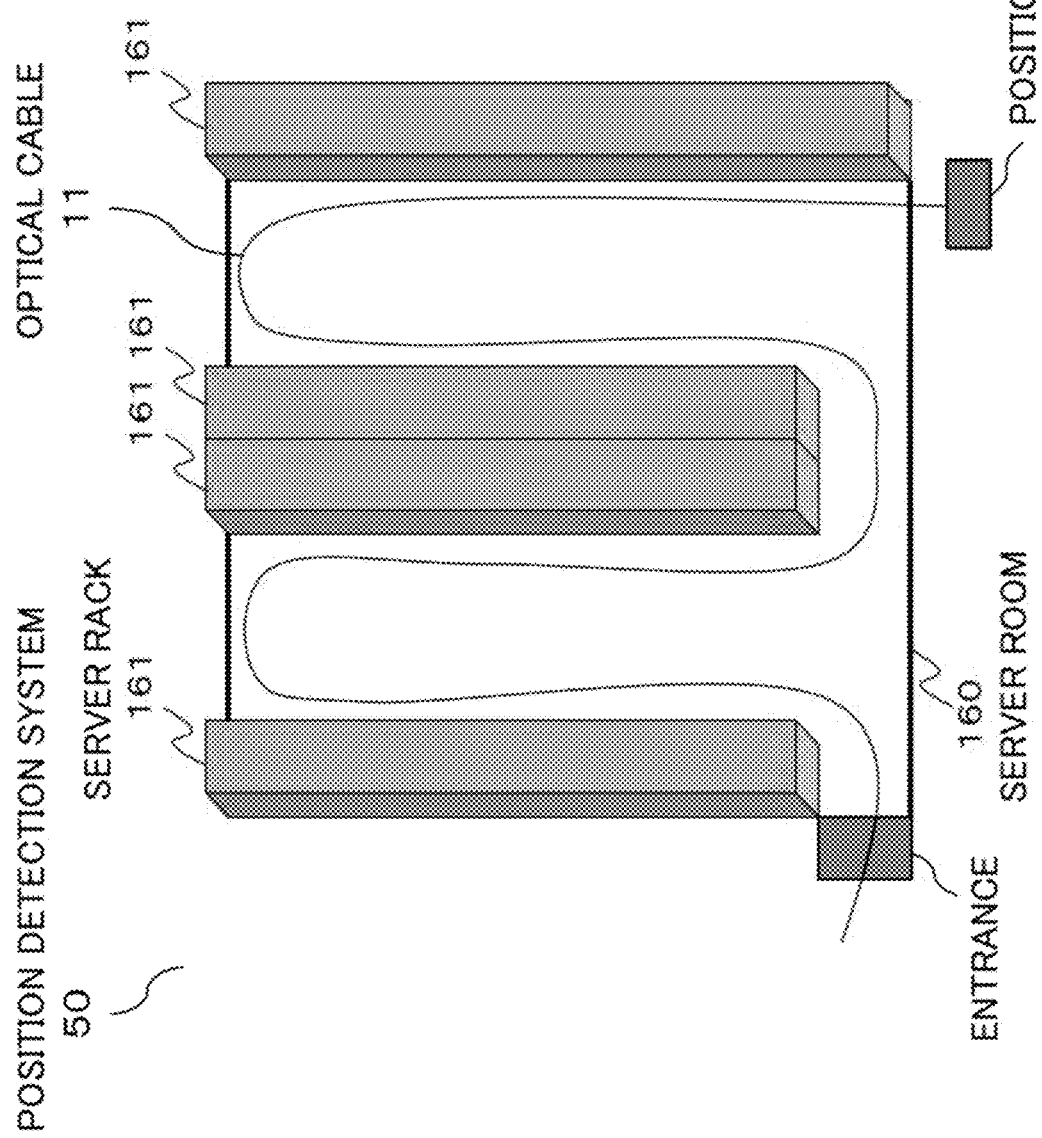
FIG. 16 is a diagram illustrating an application example of a position detection system 50 according to a fifth example embodiment.

FIG. 16 illustrates an application example of a position detection system 50 according to a fifth example embodiment. In the present example embodiment, description is made on an example in which the position detection system 50 is applied to a visitor monitoring solution in a server room. A server room 160 is a free access floor, and server racks 161 are installed on the floor of the server room. A wiring line between the server racks 161 is stored under back surfaces of the server racks 161 and the floor of the server room 160. Further, the optical cable 11 is laid under a floor of an area in the server room 160 that a visitor is allowed to enter. One end of the optical cable 11 is connected to a position detection device 12D.

Figure 17:
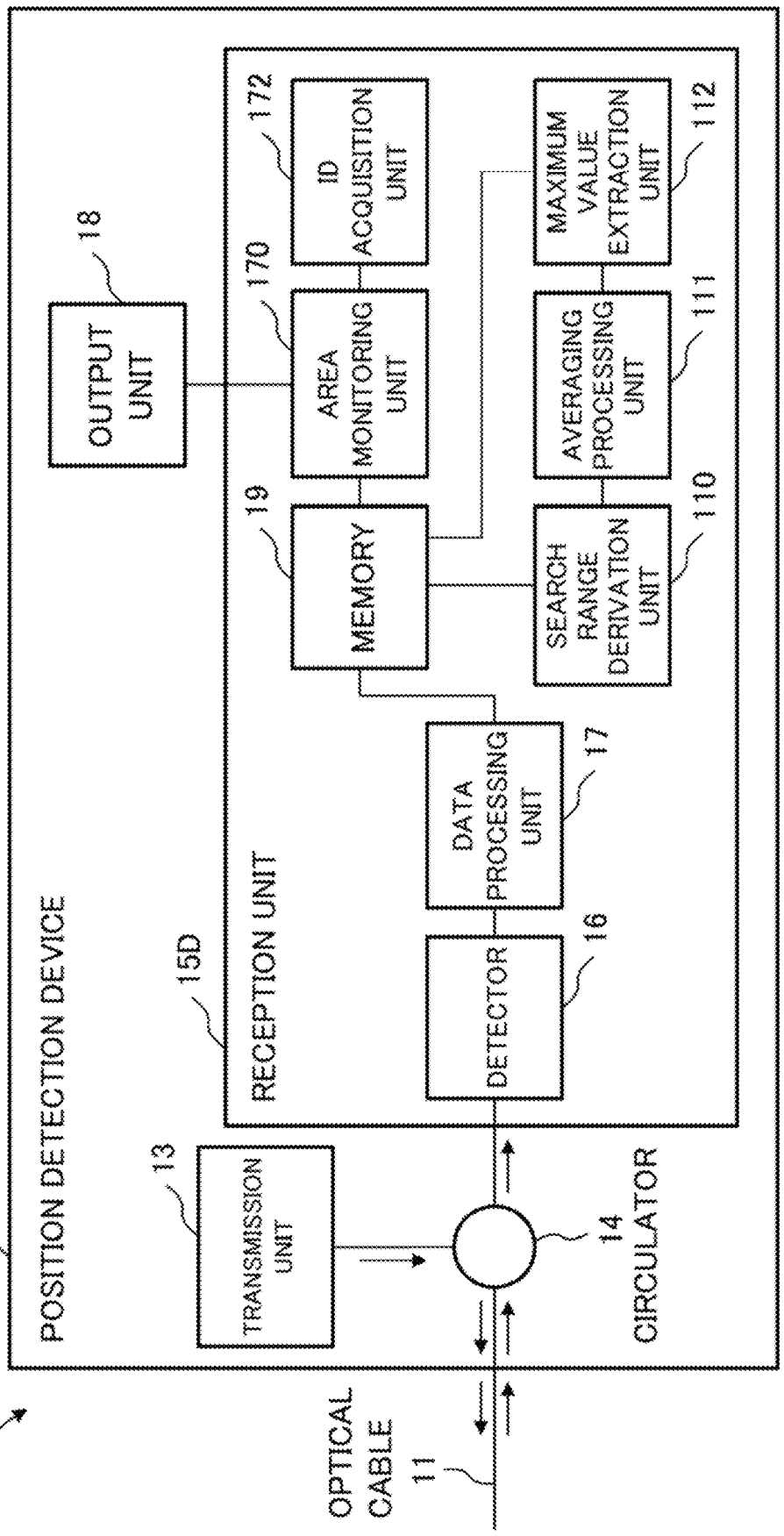
FIG. 17 is a block diagram illustrating a configuration example of the position detection system 50 according to the fifth example embodiment.
Figure 18:
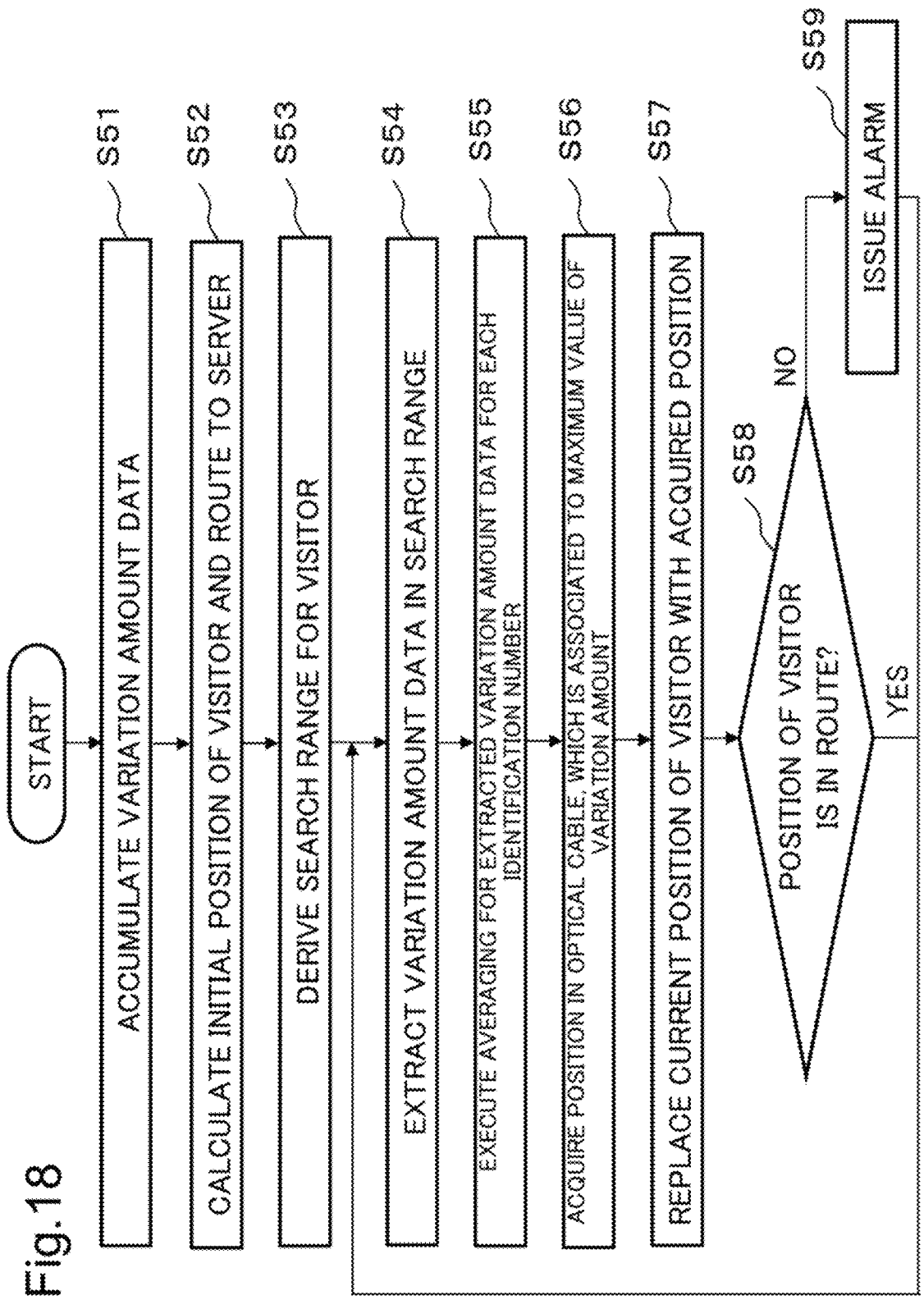
FIG. 18 is a flowchart of an operation example of a position detection device 12D.

FIG. 17 is a block diagram illustrating a configuration of the position detection system 50 according to the present example embodiment. FIG. 18 is a flowchart of an operation example of the position detection device 12D.

The position detection system 50 includes an optical cable 11 and the position detection device 12D. The position detection device 12D includes a transmission unit 13, a circulator 14, a reception unit 15D, and an output unit 18. As compared to the reception unit 15 of the position detection system 10 illustrated in FIG. 1, the reception unit 15D further includes an area monitoring unit 170 and an ID acquisition unit 172.

Operation

An operation of the position detection system 50 according to the present example embodiment is described by using FIGS. 16 and 17. The optical pulse that is output from the transmission unit 13 is output to the circulator 14. The circulator 14 outputs the optical pulse that is transmitted from the transmission unit 13, to the optical cable 11. The circulator 14 outputs back scattered light returning from the optical cable 11, to the detector 16. The detector 16 converts the back scattered light that is detected, into an analog electric signal, and outputs the electric signal to the data processing unit 17. The data processing unit 17 converts the input electric signal to a digital signal, and calculates a variation amount of intensity of the back scattered light due to vibration applied to the optical cable 11 and its generation position.

The memory 19 accumulates the calculated variation amount data in association with its generation position for a certain time period (Step S51 in FIG. 18). When a visitor enters the server room 160, the memory 19 acquires and stores a position of vibration generated when the visitor enters the server room 160 as an initial position. The ID acquisition unit 172 calculates an identification (ID, identification information) of the visitor, a position of a server owned by the visitor, and a route to the server (S52). An administrator of the server room 160 may store, in the memory 19, IDs of visitors and positions of servers owned by the visitors associated to the IDs, in association with each other. In this case, the ID acquisition unit 172 reads out the position of the server associated to the ID of the visitor from the memory 19. Then, the ID acquisition unit 172 calculates a route from the entrance of the server room 160 to the server, based on the position of the server that is read out, and outputs information containing the ID of the visitor, the position of the associated server, and the route to the server, to the area monitoring unit 170.

The search range derivation unit 110 derives a range (search range) in which the moving body can move at the moving speed in the data accumulation time, from the current position of the visitor (S53), and extracts only the variation amount data in the search range (S54). The averaging processing unit 111 executes averaging processing for the variation amount data in the search range (S55). Averaging processing in Step S55 is similar to the averaging processing in Step S04 in FIG. 2 in the first example embodiment.

The maximum value extraction unit 112 acquires a position in the optical cable 11 at which the variation amount is maximum in the variation amount data after the averaging processing (S56), and replaces the current position of the visitor, which is stored in the memory 19, with the acquired position (S57).

The area monitoring unit 170 monitors whether the current position of the visitor is in the route calculated from the ID acquisition unit (S58). Further, monitoring may be executed in such a way as to determine whether the visitor stops in front of a server other than his or her own server. When the visitor is not present in the route, the output unit 18 issues an alarm (S59). The output unit 18 may issue an alarm even when the visitor stops in front of a server other than his or her own server.

Effects

In the present example embodiment, description is made on the example in which the position detection system 50 is applied to management of visitors in the server room. The position detection system 50 determines whether the moving route in the server room that the visitor associated with the visitor ID takes matches with the position detected by the position detection system 50. With this configuration, in addition to the effects of the first example embodiment, the position detection system 50 can detect suspicious motion of the visitor.

Description is made above on the example in which the number of visitors is one. However, the position of the visitor may be monitored by using the identification number described in the second example embodiment. With this, even when the number of visitors is plural, motion of each visitor can be monitored.

Sixth Example Embodiment

Configuration

Figure 19:
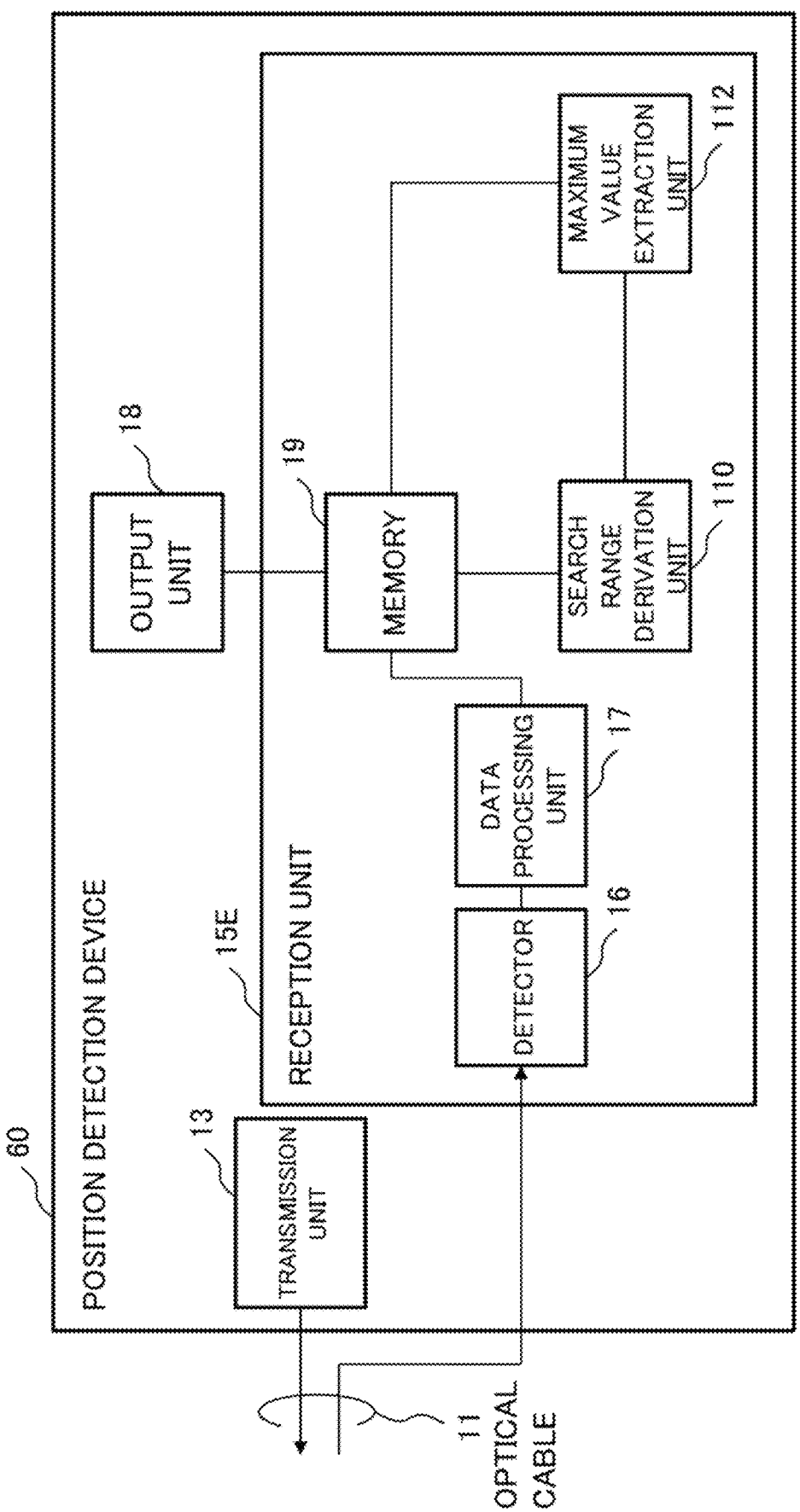
FIG. 19 is a block diagram illustrating a configuration example of a position detection device 60 according to a sixth example embodiment.

FIG. 19 is a block diagram illustrating a configuration example of a position detection device 60 according to a sixth example embodiment of the present invention. The position detection device 60 is connected to an optical transmission path 61 that is laid along a moving route of a moving body. For example, the optical transmission path 61 is an optical cable in which an optical fiber is accommodated. The position detection device 60 uses back scattered light generated in response to an optical pulse being input to the optical transmission path 61, and detects vibration applied to the optical transmission path 61 and temporal variation of the vibration in association with a position at which the vibration is applied.

The position detection device 60 includes a transmission unit 13, a reception unit 15E, and an output unit 18. The reception unit 15E includes a detector 16, a data processing unit 17, a memory 19, a search range derivation unit 110, and a maximum value extraction unit 112.

The transmission unit 13 generates an optical pulse, and repeatedly outputs the generated optical pulse to the optical transmission path 61 at a predetermined interval. The reception unit 15E receives the back scattered light from the optical transmission path 61.

Operation

FIG. 20 is a flowchart of an operation example of the position detection device 60. The operation of the position detection device 60 is described by using FIGS. 19 and 20. The optical pulse that is output from the transmission unit 13 is output to the optical transmission path 61. In the optical transmission path 61, the back scattered light is generated in response to the optical pulse. The back scattered light returning from the optical transmission path 61 is detected by the detector 16. The detector 16 converts the back scattered light that is detected, into an analog electric signal, and outputs the electric signal to the data processing unit 17. The data processing unit 17 converts the input electric signal to a digital signal, and calculates a variation amount of intensity of the back scattered light and its generation position.

The memory 19 accumulates the calculated variation amount data in association with its generation position (Step S61 in FIG. 20).

The search range derivation unit 110 derives an area (search range) in which the moving body can move from the current position during the accumulation time period for the variation amount data (S62), and extracts the variation amount data in the search range (S63). The search range derivation unit 110 outputs the extracted variation amount data to the maximum value extraction unit 112.

The maximum value extraction unit 112 extracts a position in the optical cable 11 at which the variation amount of the intensity of the back scattered light is maximum in the variation amount data (S64). Instead of the position, a distance from the starting point of the area in which the optical cable 11 is laid may be expressed. Further, the maximum value extraction unit 112 replaces the current position of the moving body, which is stored in the memory 19, with the acquired position (S65).

The output unit 18 outputs the resultant position extracted by the maximum value extraction unit 112 in association with the position of the moving body.

The position detection device 60 limits the search range for the position of the moving body to a range in which the moving body can move. Further, it is determined that variation having the maximum variation amount of the intensity of the back scattered light in the range is associated to the vibration generated along with movement of the moving body. With this, for example, an influence of vibration that is detected intensely due to resonance caused by a mounting state of the optical fiber cable or a building structure can be reduced.

In other words, the position detection device 60 according to the present example embodiment can suppress degradation of detection accuracy of the position of the moving body.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The configurations of the example embodiments may be combined with each other. For example, in place of the averaging processing unit 111, the configuration in which the reception unit 15A according to the second example embodiment includes the threshold value determination unit 113 may be applied to the reception units in the third to the fifth example embodiments. Alternatively, the reception unit 15A according to the second example embodiment may include the averaging processing unit 111 included in the other example embodiments.

The function of the position detection device in each of the example embodiments may be achieved by a computer (including a logic device and an arithmetic device) that executes a program. The function of the position detection device may be achieved by using an arithmetic device as the data processing unit 17 and causing the data processing unit 17 to execute a program stored in the memory 19. The program may be stored and distributed in a computer-readable and non-transitory recording medium such as a flexible disk and a magnetic disk, or may be delivered to the position detection device via a network.

The example embodiments described above illustrate the mode in which the vibration generated along with the movement of the moving body is detected in the optical cable 11 and thus the movement of the moving body is monitored. However, the movement may be monitored by detecting a sound generated along with the movement of the moving body.

The example embodiments described above illustrate the mode in which the generation position of the vibration is detected based on the intensity variation of the back scattered light due to Rayleigh scattering, in response to the optical pulse that is input to the optical cable 11. However, the position detection device may detect a generation position of vibration by using scattered light due to a cause other than Rayleigh scattering.

The example embodiments described above illustrate the mode in which the movement of the moving body in the building is monitored. However, a moving body outside a building can be monitored by laying the optical cable 11 outside the building.

The whole or a part of the example embodiments disclosed above can be described as, but not limited to, the following supplementary notes.

(Supplementary Note 1)

A position detection device including:

a transmission means for transmitting an optical pulse to an optical transmission path being laid along a moving route of a moving body;

a detection means for detecting back scattered light being generated in response to the optical pulse in the optical transmission path;

a data processing means for calculating intensity of the back scattered light and a generation position of the back scattered light;

a storage means for storing a processing result of the data processing means;

a search range derivation means for deriving a search range for a position of the moving body, based on a moving range of the moving body;

a maximum value extraction means for extracting the generation position at which variation of the intensity is maximum in the search range, and storing, in the storage means, the generation position being extracted; and an output means for outputting a result of the extraction in association with a position of the moving body.

(Supplementary Note 2)

The position detection device according to Supplementary Note 1, wherein the search range is a range in which the moving body is capable of moving from a current position in a predetermined time period.

(Supplementary Note 3)

The position detection device according to Supplementary Note 1 or 2, further including an identification number imparting means for imparting identification numbers to a plurality of moving bodies, the identification numbers being different from one another, wherein the maximum value extraction means extracts the generation positions of the plurality of the moving bodies, based on the identification numbers, and stores, in the storage means, the generation positions being extracted, in association with the identification numbers.

(Supplementary Note 4)

The position detection device according to any one of Supplementary Notes 1 to 3, further including
an averaging means for equalizing average values of the intensity contained in the search range and outputting the average values, wherein
the maximum value extraction means extracts the generation position, based on an output from the averaging means.

(Supplementary Note 5)

The position detection device according to any one of Supplementary Notes 1 to 4, further including
a threshold value determination means for expanding the search range in a position direction of the optical transmission path, based on a comparison result between the maximum value and a first threshold value.

(Supplementary Note 6)

The position detection device according to any one of Supplementary Notes 1 to 5, further including
a threshold value determination means for expanding the search range in a time direction, based on a comparison result between the maximum value and a second threshold value.

(Supplementary Note 7)

The position detection device according to any one of Supplementary Notes 1 to 6, further including
a circulator configured to output the optical pulse being input from the optical transmission means, to the optical transmission path, and output the back scattered light being input from the optical transmission path, to the detection means.

(Supplementary Note 8)

A position detection system, wherein
the position detection device according to any one of Supplementary Notes 1 to 7 and an optical cable in which an optical fiber is accommodated are connected to each other, and
the position detection device outputs the optical pulse to the optical fiber, and receives back scattered light being generated at the optical fiber.

(Supplementary Note 9)

A position detection method including:
transmitting an optical pulse to an optical transmission path being laid along a moving route of a moving body;
detecting back scattered light being generated in response to the optical pulse in the optical transmission path;
calculating intensity of the back scattered light and a generation position of the back scattered light;
deriving a search range for a position of the moving body, based on a moving range of the moving body;
extracting the generation position at which variation of the intensity is maximum in the search range; and
outputting a result of the extraction in association with a position of the moving body.

(Supplementary Note 10)

The position detection method according to Supplementary Note 9, wherein
the search range is a range in which the moving body is able to move from a current position in a predetermined time period.

(Supplementary Note 11)

The position detection method according to Supplementary Note 9 or 10, further including:
imparting identification numbers to a plurality of the moving bodies, the identification number being different from one another;
extracting the generation positions of a plurality of the moving bodies, based on the identification numbers; and
storing the generation positions being extracted, in association with the identification numbers.

(Supplementary Note 12)

The position detection method according to any one of Supplementary Notes 9 to 11, further including:
equalizing average values of the intensity contained in the search range and performing outputting; and
extracting the generation position, based on a result acquired by equalizing the average values.

(Supplementary Note 13)

The position detection method according to any one of Supplementary Notes 9 to 12, further including
expanding the search range in a position direction of the optical transmission path, based on a comparison result between the maximum value and a first threshold value.

(Supplementary Note 14)

The position detection method according to any one of Supplementary Notes 9 to 13, further including
expanding the search range in a time direction, based on a comparison result between the maximum value and a second threshold value.

(Supplementary Note 15)

A recording medium recording a program for causing a computer to execute:
a procedure of transmitting an optical pulse to an optical transmission path being laid along a moving route of a moving body;
a procedure of detecting back scattered light being generated in response to the optical pulse in the optical transmission path;
a procedure of calculating intensity of the back scattered light and a generation position of the back scattered light;
a procedure of deriving a search range for a position of the moving body, based on a moving range of the moving body;
a procedure of extracting the generation position at which variation of the intensity is maximum in the search range; and
a procedure of outputting a result of the extraction in association with a position of the moving body.

INDUSTRIAL APPLICABILITY

The present invention is applicable to monitoring a moving body inside and outside of a building.

REFERENCE SIGNS LIST

10, 20, 30, 40, 50 Position detection system
11 Optical cable
12, 12A, 12B, 12C, 12D, 60 Position detection device
13 Transmission unit
14 Circulator
15, 15A, 15B, 15C, 15D, 15E Reception unit
16 Detector
17 Data processing unit
18 Output unit 19 Memory
61 Optical transmission path
110 Search range derivation unit
111 Averaging processing unit
112 Maximum value extraction unit
113 Threshold value determination unit
120 Identification number imparting unit
140 Pattern learning unit
141 Pattern determination unit
160 Server room
161 Server rack
170 Aria monitoring unit
172 ID acquisition unit

What is claimed is:

1. A position detection device comprising:
a transmitter configured to transmit an optical pulse to an optical transmission path being laid along a moving route of a moving body;
a detector configured to detect back scattered light being generated in response to the optical pulse in the optical transmission path;
a memory storing instructions; and
at least one hardware processor configured to execute the instructions to implement:
a data processor configured to calculate intensity of the back scattered light and a generation position of the back scattered light;
a storage circuit configured to store a processing result of the data processor;
a search range derivation circuit configured to derive a search range for a position of the moving body, based on a moving range of the moving body;
a maximum value extraction circuit configured to extract the generation position at which variation of the intensity is maximum in the search range, and store, in the storage circuit, the generation position being extracted; and
an output circuit configured to output a result of the extraction in association with a position of the moving body.

2. The position detection device according to claim 1, wherein
the search range is a range in which the moving body is capable of moving from a current position in a predetermined time period.

3. The position detection device according to claim 1, wherein the at least one hardware processor is further configured to execute the instructions to implement:
an identification number imparting circuit configured to impart identification numbers to a plurality of moving bodies, the identification numbers being different from one another, wherein
the maximum value extraction circuit extracts the generation positions of the plurality of the moving bodies, based on the identification numbers, and stores, in the storage circuit, the generation positions being extracted, in association with the identification numbers.

4. The position detection device according to claim 1, wherein the at least one hardware processor is further configured to execute the instructions to implement:
an averaging circuit configured to equalize average values of the intensity contained in the search range and output the average values, wherein
the maximum value extraction circuit extracts the generation position, based on an output from the averaging circuit.

5. The position detection device according to claim 1, wherein the at least one hardware processor is further configured to execute the instructions to implement:
a threshold value determination circuit configured to expand the search range in a position direction of the optical transmission path, based on a comparison result between the maximum value and a first threshold value.

6. The position detection device according to claim 1, wherein the at least one hardware processor is further configured to execute the instructions to implement:
a threshold value determination circuit configured to expand the search range in a time direction, based on a comparison result between the maximum value and a second threshold value.

7. The position detection device according to claim 1, wherein the at least one hardware processor is further configured to execute the instructions to implement:
a circulator configured to output the optical pulse being input from the transmitter, to the optical transmission path, and output the back scattered light being input from the optical transmission path, to the detector.

8. A position detection system, wherein
the position detection device according to claim 1 and an optical cable in which an optical fiber is accommodated are connected to each other, and
the position detection device outputs the optical pulse to the optical fiber, and receives back scattered light being generated at the optical fiber.

9. A position detection method comprising:
transmitting an optical pulse to an optical transmission path being laid along a moving route of a moving body;
detecting back scattered light being generated in response to the optical pulse in the optical transmission path;
calculating intensity of the back scattered light and a generation position of the back scattered light;
deriving a search range for a position of the moving body, based on a moving range of the moving body;
extracting the generation position at which variation of the intensity is maximum in the search range; and
outputting a result of the extraction in association with a position of the moving body.

10. The position detection method according to claim 9, wherein
the search range is a range in which the moving body is able to move from a current position in a predetermined time period.

11. The position detection method according to claim 9, further comprising:
imparting identification numbers to a plurality of the moving bodies, the identification numbers being different from one another;
extracting the generation positions of a plurality of the moving bodies, based on the identification numbers; and
storing the generation positions being extracted, in association with the identification numbers.

12. The position detection method according to claim 9, further comprising:
equalizing average values of the intensity contained in the search range and performing outputting; and
extracting the generation position, based on a result acquired by equalizing the average values.

13. The position detection method according to claim 9, further comprising
expanding the search range in a position direction of the optical transmission path, based on a comparison result between the maximum value and a first threshold value.

14. The position detection method according to claim 9, further comprising
   expanding the search range in a time direction, based on a comparison result between the maximum value and a second threshold value.

15. The position detection device according to claim 2, further comprising
   an identification number imparting circuit configured to impart identification numbers to a plurality of moving bodies, the identification numbers being different from one another, wherein
   the maximum value extraction circuit extracts the generation positions of the plurality of the moving bodies, based on the identification numbers, and stores, in the storage circuit, the generation positions being extracted, in association with the identification numbers.

16. The position detection device according to claim 2, further comprising
   an averaging circuit configured to equalize average values of the intensity contained in the search range and output the average values, wherein
   the maximum value extraction circuit extracts the generation position, based on an output from the averaging circuit.

17. The position detection device according to claim 2, further comprising
   a threshold value determination circuit configured to expand the search range in a position direction of the optical transmission path, based on a comparison result between the maximum value and a first threshold value.

18. The position detection device according to claim 2, further comprising
   a threshold value determination circuit configured to expand the search range in a time direction, based on a comparison result between the maximum value and a second threshold value.

19. The position detection device according to claim 2, further comprising
   a circulator configured to output the optical pulse being input from the transmitter, to the optical transmission path, and output the back scattered light being input from the optical transmission path, to the detector.

20. A position detection system, wherein
   the position detection device according to claim 2 and an optical cable in which an optical fiber is accommodated are connected to each other, and
   the position detection device outputs the optical pulse to the optical fiber, and receives back scattered light being generated at the optical fiber.

* * * * *